United States Patent
Kaneyasu et al.

(10) Patent No.: US 7,215,111 B2
(45) Date of Patent: May 8, 2007

(54) MAGNETIC MOTION SENSOR

(75) Inventors: Masayoshi Kaneyasu, Itabashi (JP); Kazuhiro Komatsuzaki, Hitachi (JP); Keiichi Higuchi, Hitachi (JP); Takashi Onimoto, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 72 days.

(21) Appl. No.: 11/210,104

(22) Filed: Aug. 24, 2005

(65) Prior Publication Data

US 2006/0043963 A1 Mar. 2, 2006

(30) Foreign Application Priority Data

Aug. 26, 2004 (JP) .............................. 2004-247126

(51) Int. Cl.
*G01P 3/481* (2006.01)
*G01B 7/30* (2006.01)

(52) U.S. Cl. .............. 324/174; 324/207.25; 324/207.2; 324/173; 324/166

(58) Field of Classification Search ........ 324/166–179, 324/207.2–207.25
See application file for complete search history.

(56) References Cited

U.S. PATENT DOCUMENTS

| | | | | |
|---|---|---|---|---|
| 6,100,682 A | * | 8/2000 | Schroeder | 324/207.21 |
| 6,140,813 A | * | 10/2000 | Sakanoue et al. | 324/174 |
| 6,310,474 B1 | * | 10/2001 | Schroeder | 324/207.25 |
| 6,339,324 B1 | * | 1/2002 | Sakanoue et al. | 324/174 |
| 6,469,497 B2 | * | 10/2002 | Schroeder | 324/207.12 |
| 6,498,482 B2 | * | 12/2002 | Schroeder | 324/207.21 |
| 6,924,639 B2 | * | 8/2005 | Uenoyama | 324/207.21 |

FOREIGN PATENT DOCUMENTS

JP  07-209311 A  8/1995

* cited by examiner

*Primary Examiner*—Jay M. Patidar
(74) *Attorney, Agent, or Firm*—Foley & Lardner LLP

(57) ABSTRACT

A magnetic motion sensor has: two magnetic sensors aligned in a direction along which changes in a magnetic field shift for detecting an appearance of the changes; a differential means for taking out a differential signal of output signals from these two magnetic sensors; and a timing detection means for generating a pulse, indicating a timing at which the changes in a magnetic field pass through either of the magnetic sensors, when an output signal of the magnetic sensor in question strides over a threshold value, while generating a pulse, indicating a timing at which the changes in a magnetic field pass through in between the magnetic sensors, when the differential signal strides over the threshold value.

24 Claims, 12 Drawing Sheets

| NO. | NAME | REMARKS |
|---|---|---|
| 0 | MAGNETIC LINE ALARM | 1 = NORMAL |
| 1 | MAGNETIC LINE INTENSITY | 0 = NORMAL |
| 2 | BACKUP | |
| 3 | DIRECTION SIGNAL EFFECTIVE | TIME |
| 4 | ROTATING DIRECTION | 0 = NORMAL ROTATION |
| 5 | GAP 0 | LEAST SIGNIFICANT BIT |
| 6 | GAP 1 | |
| 7 | GAP 2 | HIGHEST-ORDER BIT |
| 8 | TEMPERATURE 0 | LEAST SIGNIFICANT BIT |
| 9 | TEMPERATURE 1 | HIGHEST-ORDER BIT |
| 10 | BACKUP | |
| 11 | PARITY | |

MAGNETIC MOTION SENSOR

The present application is based on Japanese patent application No. 2004-247126, the entire contents of which are incorporated herein by reference.

BACKGROUND OF THE INVENTION

1. Field of the Invention

The present invention relates to a magnetic motion sensor used as a rotation sensor in combination with a rotor and, more particularly, to a magnetic motion sensor with enhanced reliability.

2. Description of the Related Art

Heretofore, a noncontact rotation sensor to detect rotation of a rotor is known in which a change in magnetic field generated when a magnetic material rotates together with the rotor is detected by a magnetic sensor to output a pulse signal relating to the rotation.

Rotation sensors as shown in FIGS. 19 and 20 are used to detect a rotation of tire in ABS (=antilock brake system), which is a brake control system for automobiles.

The rotation sensor as shown in FIG. 19 is constructed such that a gear (rotor) 201 made of a magnetic material is attached to a rotating shaft (no shown) of tires, and a Hall IC 203 with a Hall element 202 mounted thereon is disposed radially outside of the rotor 201 wherein the Hall IC 203 is disposed such that the single-sided Hall element 202 is opposed to each tooth of the rotor 201 (rotor tooth 204), and a magnet 205 (hereinafter referred to as "back magnet") is disposed on the opposite side of the Hall IC 203.

A magnetic flux formed in a direction from the back magnet 205 to the rotor 201 passes densely through the Hall element 202 when the Hall IC is right in front of a rotor tooth 204. It disperses when the Hall IC 203 is faced to a valley between rotor teeth. Thereby, the Hall element 202 can detect strong and weak changes in a magnetic field. The Hall IC 203 converts the changes in the magnetic field (output signals of the Hall element) into pulses being binary signals in a circuit inside the Hall IC to output the signals. When a passage speed of rotor teeth is detected from widths or cycles of these pulses, a turning angle velocity or number of rotations of the rotating shaft can be determined.

The rotation sensor as shown in FIG. 20 is constructed such that a rotation disk (rotor) 212 with plural magnets 211 each of which has a polarity alternated is attached to a rotating shaft of tires, and a Hall IC 214 with a Hall element 213 is opposed to the rotor 212. The Hall IC 214 is disposed such that the single-sided Hall element 213 is opposed to magnets (hereinafter conveniently referred to as "rotor teeth") 211. When the Hall IC 214 is right in front of the rotor teeth, a magnetic flux from the rotor teeth passes through the Hall element 213, while when the Hall IC 214 is right in front of an area between teeth, the magnetic flux from the rotor teeth 211 does not pass through the Hall element 213, so that magnetic field change signals are obtained from the Hall element as in the case of the rotation sensor of FIG. 19, whereby outputs of pulses can be taken out from the Hall IC.

According to the art disclosed in Japanese Patent. Application Laid-Open No. 7-209311, three Hall elements facing to a rotor are aligned, magnetic field change wave forms wherein phases thereof deviate from the respective Hall elements are detected, and binary signals obtained from the respective magnetic field change wave forms are synthesized, whereby pulses each having a short period of time are obtained even in case of a low speed rotation.

Incidentally, in case of manufacturing the rotation sensor of FIG. 19, the Hall IC is provided as a part prepared by incorporating the Hall element, the back magnet, and a circuit with each other, while the rotor is provided as an assembly of a bearing called usually a hub, and a combination of the Hall IC with the rotor is completed in an assembly line of the hub for the first time. In case of the rotation sensor of FIG. 20 also, the Hall IC and the rotor are provided as separate parts, and a combination of them is completed in an assembly line of a hub for the first time. Moreover, the hub is assembled with respect to a rotation shaft of tires in an automobile assembly line.

In the present specification, a part of the Hall IC among these rotation sensors is treated as a magnetic motion sensor for detecting changes in a magnetic field appearing as a result of spatial movement.

The rotation sensors of the prior art involves the following problems.

(1) In rotor teeth, there are dispersions in dimensions (height, circumferential width, thickness, pitch) dependent upon its forming accuracy. For this reason, outputs of pulses from a Hall IC involve dispersions in a pulse width and a pulse cycle even when a rotor rotates at a constant speed. Hence, a passage speed of an individual rotor tooth cannot be detected with a high degree of accuracy.

(2) Irrespective of a rotating direction of a rotor, the Hall IC outputs pulses in common with both the directions, and thus, its real rotating direction cannot be detected.

(3) Although the Hall IC detects a magnitude of a magnetic field, such magnitude of a magnetic filed depends on a size of a gap between a rotor tooth and the Hall IC. Accordingly, there is a case where changes in a magnetic field cannot be detected dependent on a size of the gap by means of rotor teeth. In this respect, however, there is no effective means for judging the fact that the gap has a suitable size at the time of installing the Hall IC.

(4) In the manner of FIG. 19, there are differences among intensities in a magnetic field detected by the Hall IC dependent upon differences in installing positions or characteristics of a magnet. In this respect, however, there is no means for determining differences in intensities of the magnetic field at the time of installing the magnet.

(5) As to a pulse width of pulses output from the Hall IC, binarization is made by applying a threshold value to an intensity of a magnetic field detected by the Hall IC, so that it depends on a size of a gap between a rotor tooth and the Hall IC. In other words, even if a rotational velocity exhibits the same value, there is a case where a pulse width becomes narrow or wide dependent upon an installed position of the Hall IC. It makes a processing for rotating velocity and accelerated velocity in a device in the subsequent stage by which outputs from the Hall IC are received difficult.

(6) Concerning not only automobiles, but also objects to which a detection of rotation is applied, there is a case where noises due to electromagnetic factors (ignition, motor driving and the like) or mechanical factors (blurring in a gap) arise. A detection of rotation or a communication with superior machinery is adversely affected by these noises.

(7) When output signals from the Hall element are simply binarized, pulse strings similar to a concavo-convex profile of the rotor teeth are obtained. However, a pulse width or a pulse interval becomes broadened in case of a comparatively low-speed rotation, so that a waiting time for detecting rotations in the subsequent device is lengthened. Moreover, in either a case of a remarkably low-speed rotation or a case of stopping rotation, no pulse is obtained, and in such case, it cannot be discriminated even whether the Hall element is active or inactive in the subsequent device.

In addition, a part of the Hall IC (magnetic motion sensor) is provided as a separate part from a rotor as mentioned above, so that it is difficult to decide that where is a cause for the above enumerated problems and failures accompanied therewith in an assembled rotation sensor. As a result, a reliability of a rotation sensor cannot be assured.

SUMMARY OF THE INVENTION

It is an object of the invention to provide a magnetic motion sensor with enhanced reliability.

(1) According to one aspect of the invention, a magnetic motion sensor comprises:

two magnetic sensors disposed along a direction in which a change in magnetic field shifts to detect the change;

a differential means for taking out a differential signal of output signals from the two magnetic sensors; and a timing detection means for generating a pulse indicating a timing that a change in magnetic field passes through either of the magnetic sensors when an output signal of said either of magnetic sensor strides over a threshold value, and for generating a pulse indicating a timing that a change in magnetic field passes through in between the magnetic sensors when the differential signal strides over the threshold value.

(2) According to another aspect of the invention, a magnetic motion sensor comprises:

three magnetic sensors disposed along a direction in which a change in magnetic field shifts to detect the change;

a differential means for taking out a differential signal of output signals from two magnetic sensors of the three magnetic sensors; and a timing detection means for generating a pulse indicating a timing that a change in magnetic field passes through a magnetic sensor which is not used for the differential means when an output signal of said magnetic sensor not used for the differential means strides over a threshold value, and for generating a pulse indicating a timing that a change in magnetic field passes through in between the magnetic sensors when the differential signal strides over the threshold value.

(3) According to another aspect of the invention, a magnetic motion sensor comprises:

three magnetic sensors disposed along a direction in which a change in magnetic field shifts to detect the change;

a differential means for taking out a differential signal of output signals from two magnetic sensors in each of two pairs selected from the three magnetic sensors; and a timing detection means for generating a pulse indicating a timing that a change in magnetic field passes through in between either of the two pairs of the magnetic sensors when the differential signal of said either of the two pairs of the magnetic sensors strides over a threshold value.

The timing detection means may have two threshold values having different values applied to a signal to be a target, and when the signal to be a target strides over either of the threshold value and then, strides over the other threshold value, the pulse is generated.

The timing detection means may operate such that a peak value of a pulse which is obtained first in the pulses obtained from two signals to be targets is made to differ from a peak value of the pulse obtained subsequently.

The timing detection means may detect a passage direction of the changes in a magnetic field dependent upon an order which signal in the two signals to be targets is a precedential to obtain the pulse.

The timing detection means may detect whether or not there is no change in a magnetic field, or that there are very little changes in a magnetic field based on such fact that the pulse is not obtained for a certain period of time.

The magnetic motion sensor may comprise further a communication means for outputting the two pulses to the outside through the same signal line.

The communication means may output status signals indicating statuses of the magnetic motion sensor to the outside through the same signal line.

The communication means may calculate a passage speed of the changes in a magnetic field from a time interval between the two pulses and alignment gaps of the magnetic sensors, and inserts the status signals in between the two pulses and the following two pulses to be output to output, when the passage speed becomes slower as a result of striding over a predetermined value, while stops to output the status signals, when the passage speed becomes faster as a result of striding over the predetermined value.

The magnetic motion sensor may comprise further a status production means for detecting peaks of output signals of the magnetic sensors, calculating a moving average deviation of peak values with respect to peaks obtained repeatedly over plural times, and producing a status indicating a reliability in detection for the changes in a magnetic field based on the moving average deviation.

The status production means may detect high peaks and low peaks of output signals of the magnetic sensors, calculates the moving average deviations with respect to the respective peaks to produce statuses indicating a degree of appropriateness in positions of installation for magnetic sensors by numerical values in response to a difference between a moving average deviation of high peaks and a moving average peaks of low peaks, produces such a status that there is a weak magnetic field, when the moving average deviation of the high peaks is less than a predetermined value for the high peaks, while produces such a status that there is a sufficient magnetic field, when the moving average deviation of the high peaks is more than a predetermined value for the high peaks, and produces such a status that there is a high reliability in detection for the changes in a magnetic field, when the magnetic field is sufficient and the degree of appropriateness in positions of installation for the magnetic sensors is higher than a predetermined value for the degree of appropriateness.

The status production means may produce a status indicating a passage direction of the changes in a magnetic field.

The status production means may detect low peaks of output signals of the magnetic sensors, and produces a status indicating rise and fall of an ambient temperature by ranks in response to the moving average deviation with respect to the peaks.

BRIEF DESCRIPTION OF THE DRAWINGS

The present invention will be explained in more detail in conjunction with appended drawings, wherein.

DESCRIPTION OF THE PREFERRED EMBODIMENTS

[First Embodiment]

Figure 1A:
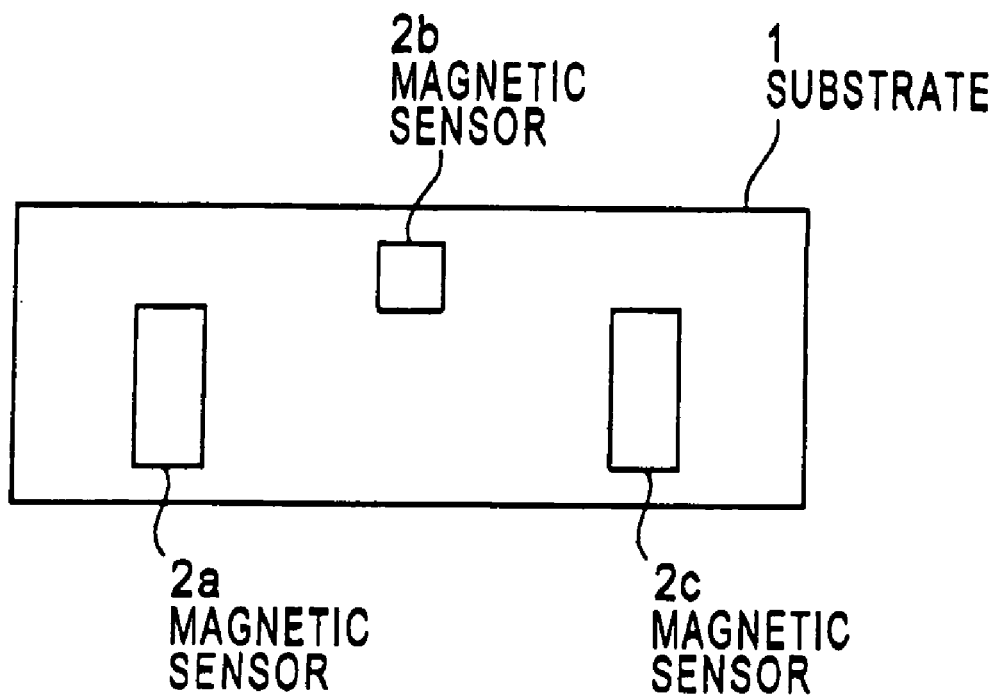
FIG. 1A is a front view showing a magnetic motion sensor according to a first embodiment of the invention.

FIG. 1A shows a magnetic motion sensor in a first preferred embodiment according to the invention. The magnetic motion sensor is provided with two magnetic sensors 2a and 2c arranged in parallel along the longitudinal direction of a substrate 1 on the surface thereof, an auxiliary magnetic sensor 2b disposed in between the magnetic sensors 2a and 2c wherein the auxiliary magnetic sensor 2b is positioned out of the alignment of the magnetic sensors 2a and 2c, and a circuit (not shown) disposed in an area where the magnetic sensors 2a, 2b, and 2c do not exist in the surface of the substrate 1. The magnetic sensors 2a, 2b, and 2c are, for example, Hall elements wherein the two magnetic sensors 2a and 2c have the same shapes and the same dimensions, and sensitivities with respect to magnetism are the same, as a matter of course. On one hand, since the magnetic sensor 2b has different functions from that of the magnetic sensors 2a and 2c as mentioned hereunder, the magnetic sensor 2b may differ from the other magnetic sensors 2a and 2c in its shape, dimension, and magnetic sensitivity, but it is desired that all the three magnetic sensors 2a, 2b, and 2c have the same temperature characteristics. Orientations (an inclination of principal directions in detection for magnetism) of the respective magnetic sensors 2a, 2b, and 2c are identical with each other, and it is perpendicular to the surface of the substrate 1.

In the magnetic motion sensor, the two magnetic sensors 2a and 2c are aligned in a direction along which changes shift for detecting the changes in a magnetic field. When the magnetic motion sensor is applied to a rotation sensor shown in FIG. 19 or FIG. 20, it is possible to detect an appearance of changes in a magnetic field in spatial shifting by means of a motion of rotor teeth accompanied with a rotation of the rotor. In case of applying the magnetic motion sensor to the rotation sensor of FIG. 19, a magnet is attached to the back of the substrate 1, as a matter of course.

[Second Embodiment]

Figure 1B:
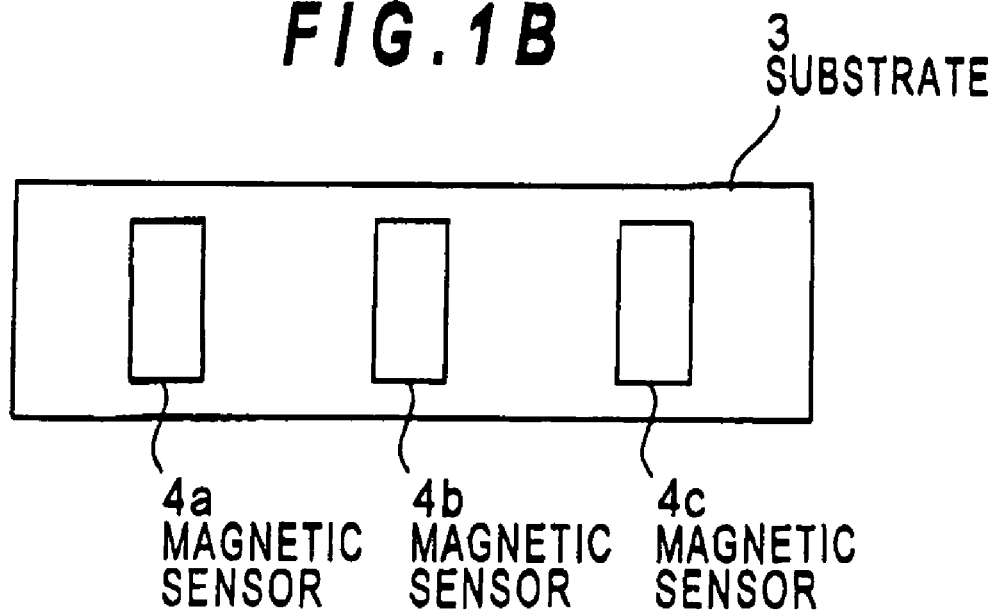
FIG. 1B is a front view showing a magnetic motion sensor according to a second embodiment of the invention.

FIG. 1B shows a magnetic motion sensor in a second preferred embodiment according to the invention. The magnetic motion sensor is provided with three magnetic sensors 4a, 4b, and 4c aligned in parallel along the longitudinal direction of a substrate 3 on the surface thereof, and a circuit (not shown) disposed in an area where the magnetic sensors 4a, 4b, and 4c do not exist in the surface of the substrate 3. The magnetic sensors 4a, 4b, and 4c are, for example, Hall elements. The three magnetic sensors 4a, 4b, and 4c have the same shapes and dimensions, and their orientations, sensitivities, and temperature characteristics are the same, respectively, as a matter of course. This magnetic motion sensor may be applied to the rotation sensor shown in FIG. 19 or FIG. 20 as in the case of FIG. 1A.

Figure 2A:
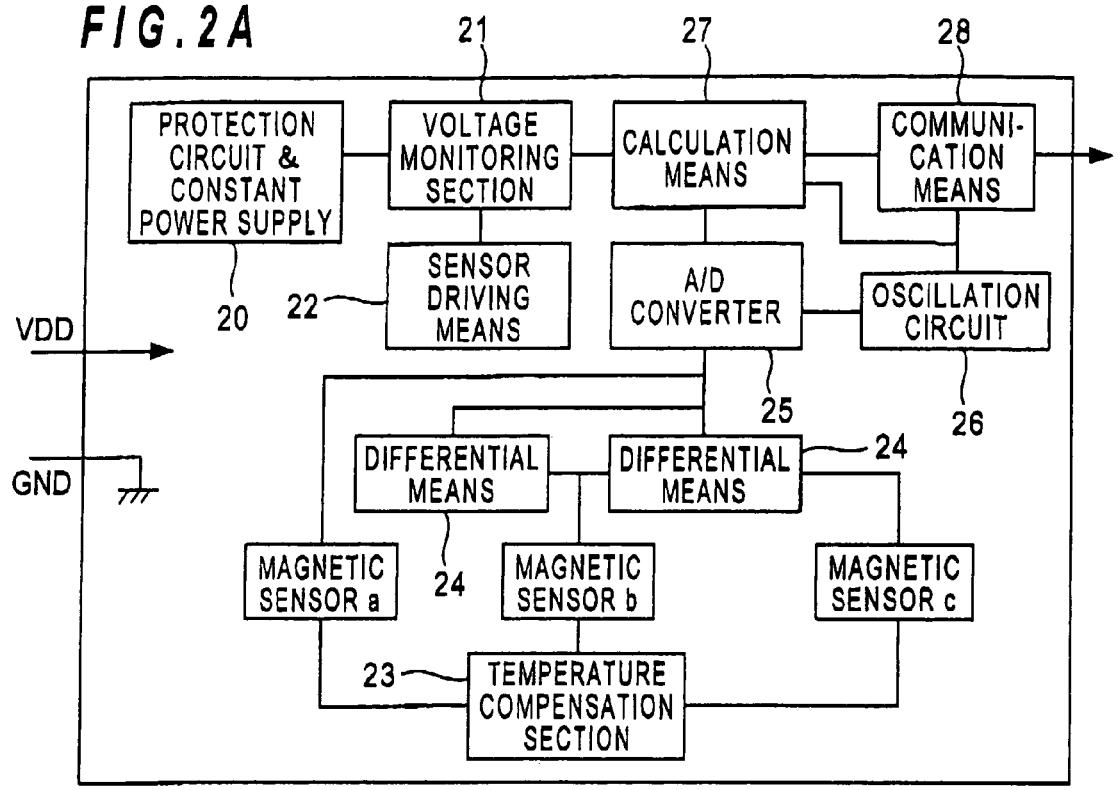
FIG. 2A is a circuit block diagram showing a magnetic motion sensor according to the invention.
Figure 2B:
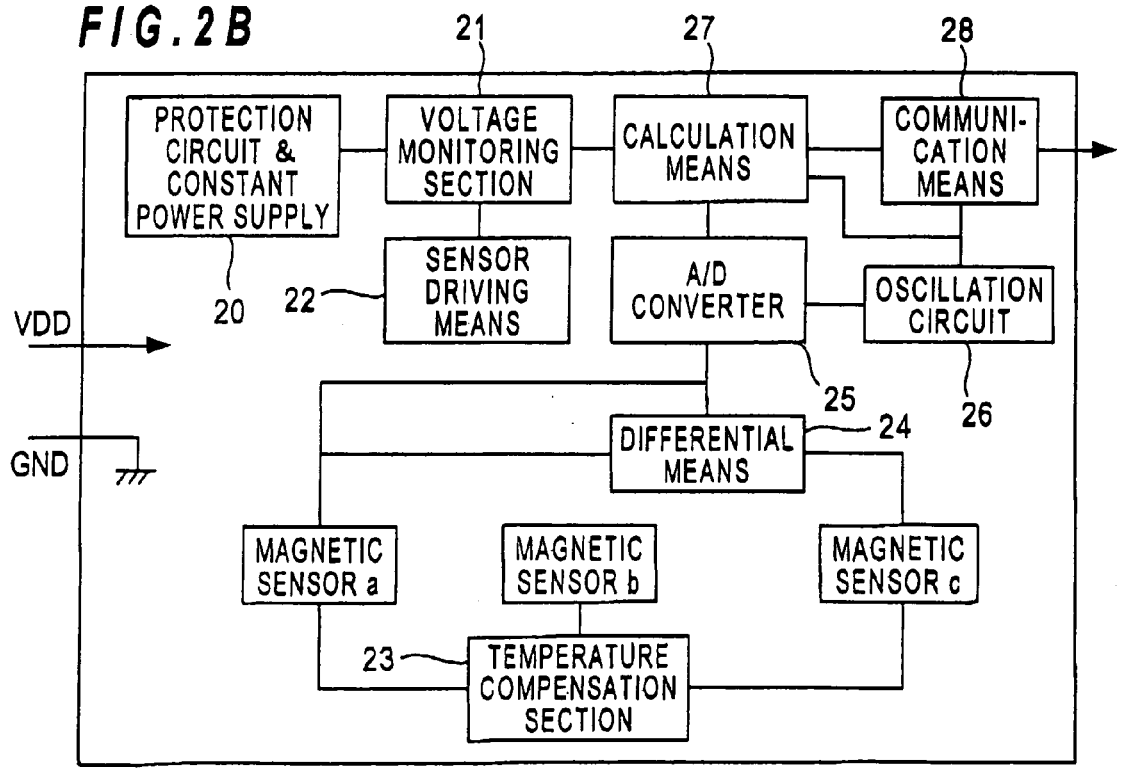
FIG. 2B is another circuit block diagram showing a magnetic motion sensor according to the invention.

A circuit constitution suitable for the magnetic motion sensor of FIG. 1A is shown in FIG. 2B, while a circuit constitution suitable for the magnetic motion sensor of FIG. 1B is shown in FIG. 2A.

Figure 19:
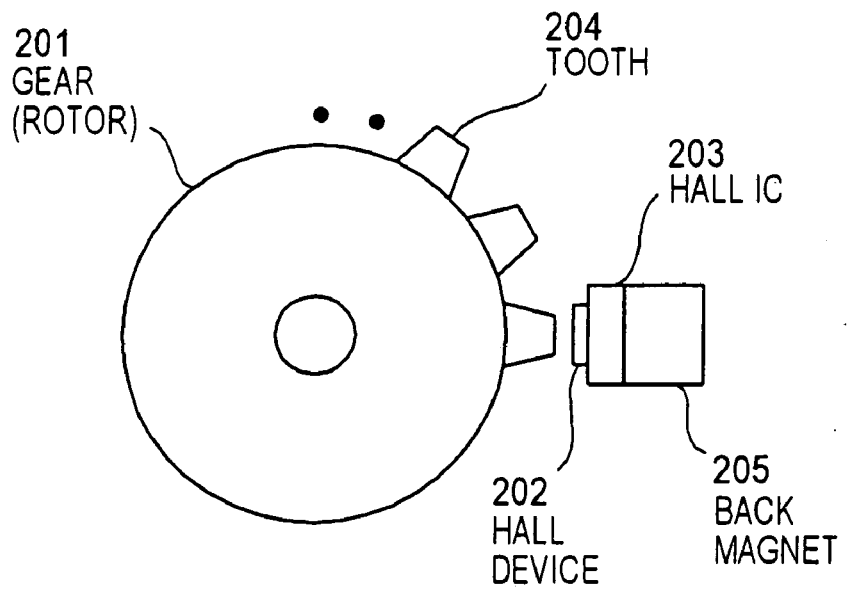
FIG. 19 is a constitutional diagram illustrating a principle of a rotating sensor.
Figure 20:
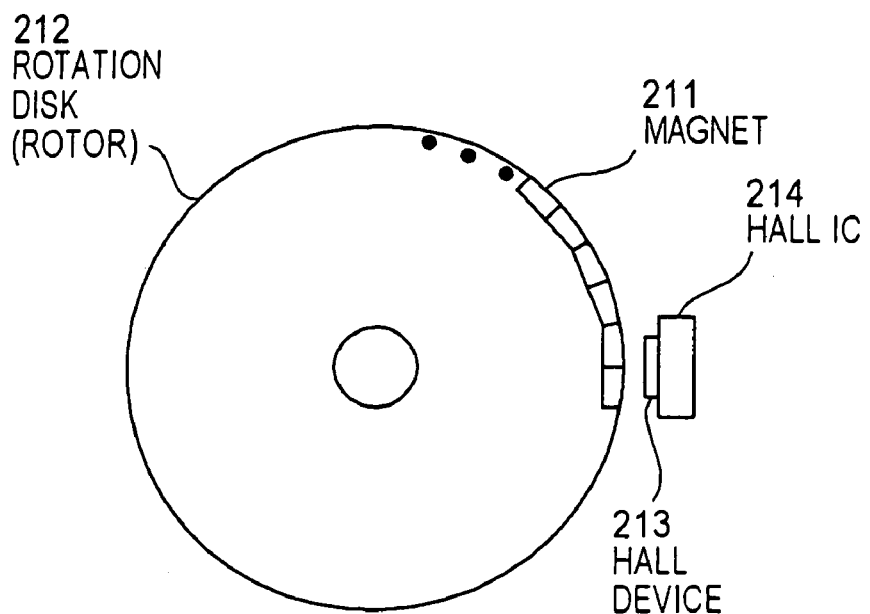
FIG. 20 is a constitutional diagram illustrating a principle of a rotating sensor.

As shown in FIG. 2A, a circuit of the magnetic motion sensor is provided with a protection circuit functioning also as a constant power supply section 20 for supplying an internal power source based on an external power supply VDD-GND, a voltage monitoring section 21 for monitoring a voltage of the internal power source, a sensor driving means 22 for supplying a driving power to magnetic sensors, and three of the magnetic sensors a, b, and c made of Hall elements disposed so as to face rotor teeth as shown in FIG. 19 or FIG. 20 for constituting a rotation sensor, a temperature compensation section 23 for using one or more of output signals from the magnetic sensors a, b, and c to correct the output signal(s) other than that used into the one which is temperature-compensated thereby, two differential means 24 and 24 by one of which a differential signal between the magnetic sensors a and b is taken out, while another differential signal between the magnetic sensors b and c is taken out from the other differential means, an A/D converter 25 for analog-to-digital converting these differential signals, an oscillating circuit 26 for generating a reference clock used for sampling and a timing determination, a calculation means 27 for calculating a variety of calculations based on data sampled, and a communication means 28 for outputting output pulses and status signals produced by the calculation means 27 to the outside.

In the circuit of FIG. 2B, output signals from the magnetic sensor a are input to the A/D converter 25 and the differential means 24.

The magnetic sensors 2a, 2b, and 2c described in FIG. 1A, or the magnetic sensors 4a, 4b, and 4c described in FIG. 1B may be applied to the magnetic sensors a, b, and c. However, when the magnetic sensors 2a, 2b, and 2c are used, such a manner that one of the differential means 24 and 24 is used to take out differential signals between the magnetic sensors a and c may be applied. Furthermore, it is desirable for the purpose of producing a status that one or more output signal(s) from the magnetic sensors a, b, and c is (are) input to the A/D converter 25.

The calculation means 27 constitutes a timing detection means and a status producing means of the present invention.

Operations as a rotation sensor in the magnetic motion sensor according to the invention will be described hereinafter wherein reference characters designating respective components in the following description are in accordance with those described in the above-described FIGS. 1A, 1B, 2A, 2B, 19 and 20.

(1) Initial Action of IC

Figure 3:
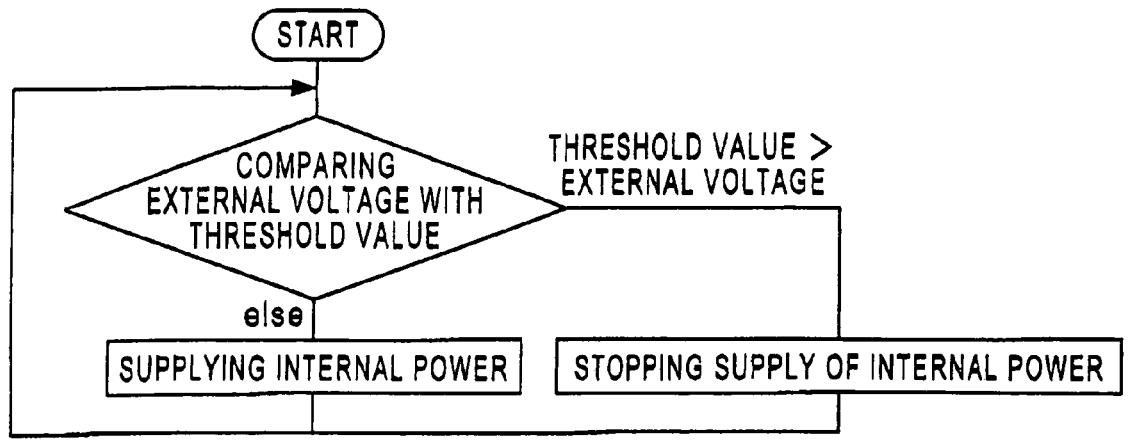
FIG. 3 is a flowchart illustrating initial actions in the invention.

As shown in FIG. 3, a protection circuit functioning also as a constant power supply 20 and a voltage monitoring section 21 compare an external voltage supplied with a threshold value which has been previously determined. When the external voltage is lower than the threshold value, an internal power supply to the respective components is stopped. On the other hand, when the external voltage supplied is higher than the threshold value, an internal power is supplied to the respective components. The respective components are operated when the internal power is supplied thereto.

The initial action of the IC is intended to start operations in only the case where an external electric power is supplied in an amount sufficient to normally operate a magnetic motion sensor is supplied thereto, whereby changes in a magnetism are detected, and communications relating to output pulses are made.

Although there is not shown, but a communication means 28 does not output output pulses and status signals to the outside immediately after starting a supply of an internal power, but output is started after obtaining several pulses of output pulse is completed. On one hand, status signals may be output immediately after starting the supply of an internal power.

(2) Actions in Case of Operating the IC

Figure 4:
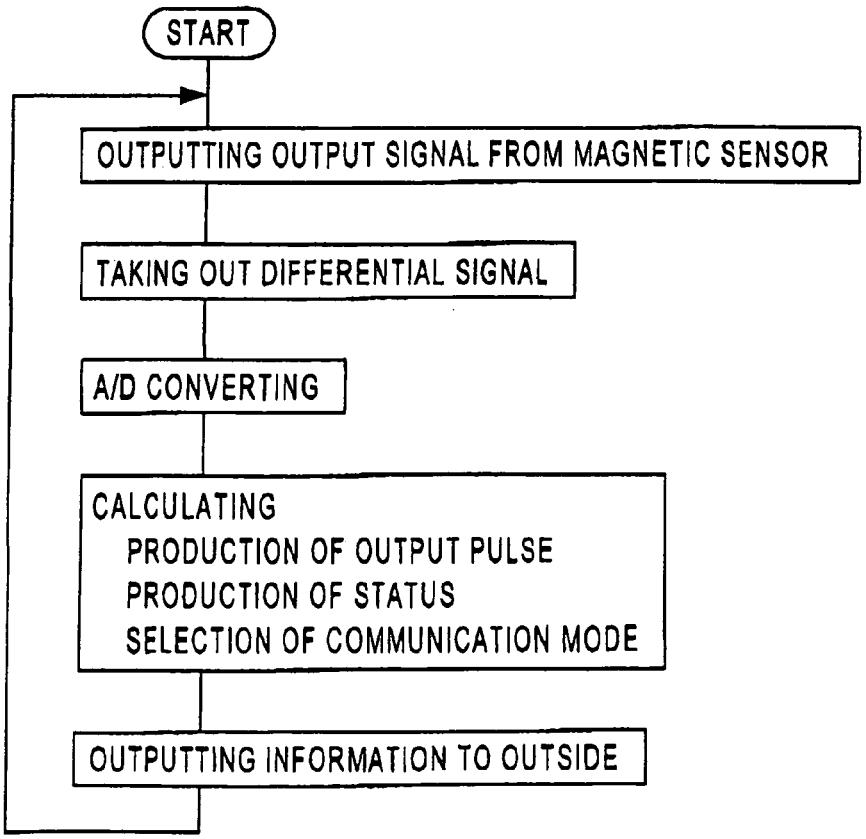
FIG. 4 is a flowchart illustrating actions in an operating condition.

As shown in FIG. 4, a magnetism is detected, and signals proportional to intensities of the magnetism are output in magnetic sensors a, b, and c. In differential means 24 and 24, a differential signal between the magnetic sensors a and b, and a differential signal between b and c are taken out. In an A/D converter 25, these differential signals are analog-to-digital converted to obtain data, and it is stored in a memory (not shown) as data sampled.

In a calculation means 27, a production of output pulses, a production of status signals, and a section of communication modes (which will be described in detail hereinafter) are made. In a communication means 28, either the output pulses and the status signals, or only the output pulses are output to the outside as information.

(3) Output Signals to the Outside

Figures 5, 6:
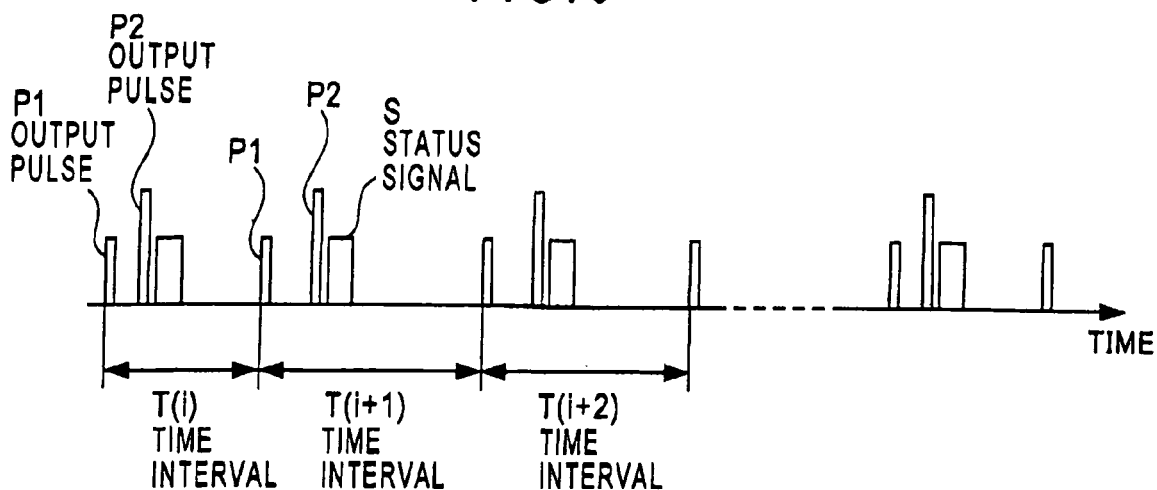
FIG. 5 is a waveform chart showing output signals to the outside in the invention.
FIG. 6 is a diagram showing a constitution of status signals.

The communication means 28 outputs signals of plural types from a signal line, and typical output wave forms are shown in FIG. 5 wherein output signals to the outside is composed of output pulses P1 and P2, and status signals S.

As shown in FIG. 5, two types of output pulses P1 and P2 having different peak values are obtained with a certain interval with respect to a passage of one rotor tooth. In this case, it is adapted to be such that an output pulse having a lower peak value appears first inevitably. These output pulses P1 and P2 indicate a timing at which either changes in a magnetic field accompanied with a passage of a rotor tooth pass through one sensor, or changes in a magnetic field pass thorough in between two magnetic sensors. In the circuit constitution of FIGS. 2A and 2B, these output pulses P1 and P2 are obtained in the case when a rotor tooth passes through in between the magnetic sensors a and b, and the magnetic sensors b and c, respectively. Accordingly, as shown in FIG. 5, output pulses P1 and P2 based on a passage of a natural number i+1st rotor tooth are obtained after output pulses P1 and P2 based on a passage of an i-th rotor tooth are obtained in a signal line of the communication means 28. A mechanism in which output pulses P1 and P2 are obtained will be described later.

A status signal S based on a passage of the i-th rotor tooth is output after the output of an output pulse P2 having a higher peak value based on a passage of the i-th rotor tooth wherein the status signal is a serial data consisting of a plurality of bits.

(4) Constitution of Status Signal

Although the number of respective bits constituting a status signal is arbitrary, a case of eleven bits is shown in FIG. 6. A status is composed of from a status number 0 in this order corresponding to "magnetic line alarm", "magnetic line intensity", "backup", "direction signal effective", "rotating direction", "gap 0", "gap 1", "gap 2", "temperature 0", "temperature 1", "backup", and "parity". Details of these statuses will be described later.

(5) Production Timing of Output Pulse (According to a Second Embodiment)

Figure 7:
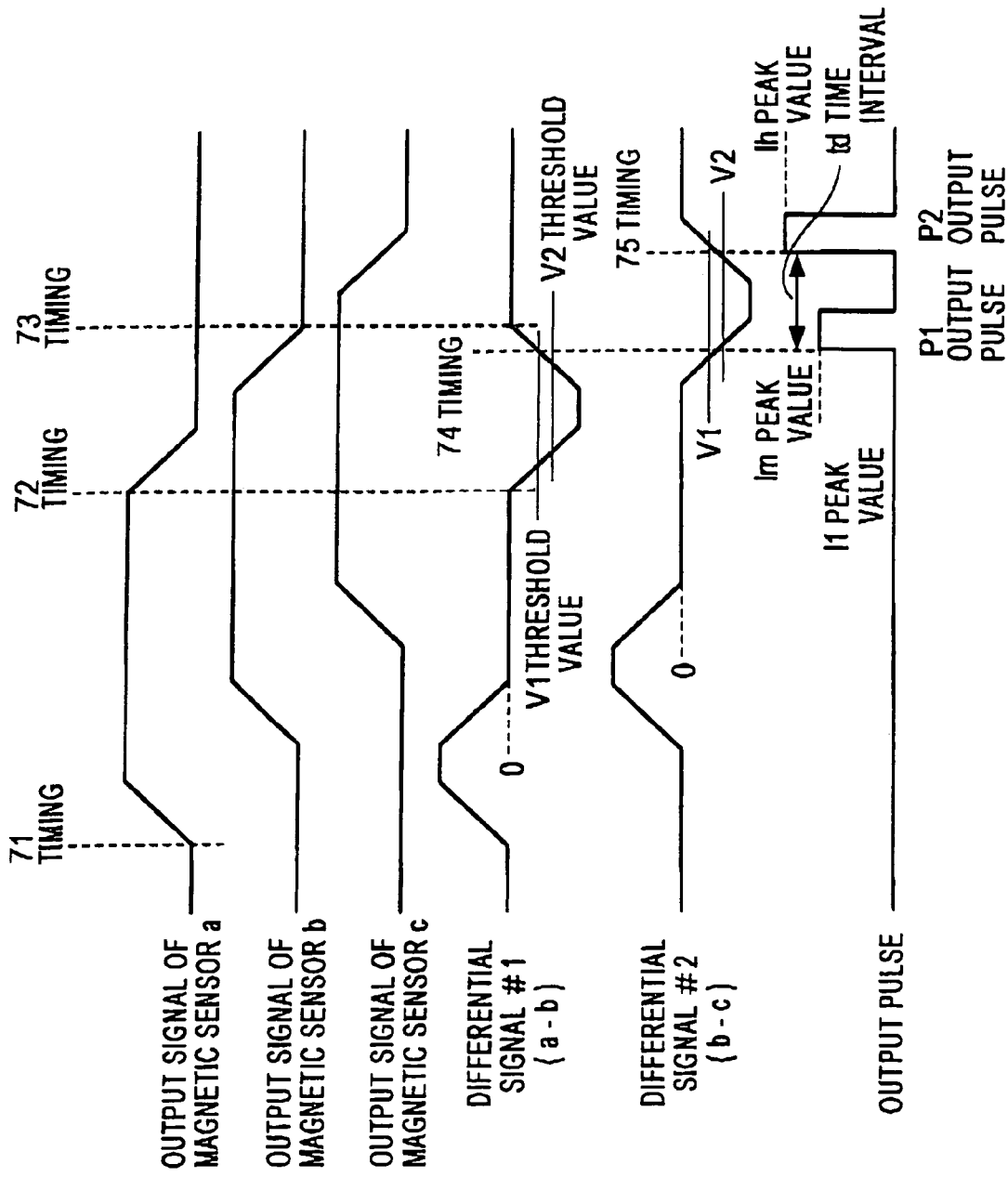
FIG. 7 is a signal diagram showing signal wave forms in respective sections in the invention.

FIG. 7 shows waveforms obtained by using the magnetic motion sensor of FIG. 1B (the circuit of FIG. 2A) wherein a rotor is in a normal rotation in which the abscissa indicates a time, while the ordinate indicates a voltage. In this case, the term "normal rotation" means a manner of rotation wherein a certain rotor tooth passes through the magnetic sensors a, b, and c in this order.

As shown in FIG. 7, when a leading edge in its rotating direction of a certain rotor tooth approaches the front of the magnetic sensor a (a timing 71), a voltage of an output signal in the magnetic sensor a begins to increase, and the output signal in the magnetic sensor a maintains the peak during a period wherein the rotor tooth is faced to the front of the magnetic sensor a. When a trailing edge in its rotating direction of the rotor tooth goes out of the front of the magnetic sensor a (a timing 72), the output signal in the magnetic sensor a decreases. It is to be noted that a raw output signal changes curvilineally, while when the raw output signal is converted by an A/D converter 25 into eight gradation sequences to become a stair step wave form, and in this case, a simplified wave form is drawn. In also the magnetic sensors b and c, similar wave forms are obtained with delayed periods of time corresponding to distances with which the magnetic sensors b and c are disposed, respectively. In other words, it may be said that the magnetic sensors a, b, and c detect changes in a magnetic field at the positions of the respective magnetic sensors a, b, and c, when changes in the magnetic field shift in a direction along which the magnetic sensors a, b, and c are aligned to produce such changes.

A differential signal (a–b) produced by a differential means 24 (hereinafter referred to as "#1") ascends and descends during an interval between an ascendant period of an output signal of the magnetic sensor a and an ascendant period of an output signal of the magnetic sensor b, and it becomes 0 as a result of being canceled with each other during a period wherein both the output signals of the magnetic sensors a and b maintain their peaks, respectively. During an interval from starting a descendant (the timing 72) of an output signal of the magnetic sensor a to finishing a descendant (the timing 73) of an output signal of the magnetic sensor b, the differential signal #1 descends once below 0, and then it ascends. In also a differential means 24 producing a differential signal (b–c) (hereinafter referred to as "#2"), similar wave forms are obtained with delayed periods of time corresponding to distances with which the magnetic sensors b and c are disposed, respectively.

A timing detection means has two threshold values having different values as that to be applied to a signal to be a target for timing detection wherein when the signal to be a target strides over either of the threshold value and then, it strides over the other threshold value, an output pulse is generated. In this case, for detecting that the differential signal #1 descends, and then it ascends, a normal threshold value V1 having a predetermined value less than 0 and a subsidiary threshold value V2 having a slightly less value than that of the normal threshold value V1 are used.

When the differential signal #1 descends less than 0, first it strides downwardly over the normal threshold value wherein no output pulse is generated. Thereafter, when the differential signal #1 strides over the subsidiary threshold value V2 and it increases more than the subsidiary threshold value V2, a generation of an output pulse becomes possible. When the differential signal #1 ascends and strides over the normal threshold value V1 (a timing 74), the timing detection means generates an output pulse P1 having a peak value Im.

On the other hand, the same normal threshold value V1 and subsidiary threshold value V2 are also applied to the differential signal #2. Accordingly, when the differential signal #2 strides over the subsidiary threshold value V2 to be reduced less than the subsidiary threshold value V2 and then it strides over the normal threshold value V1 (a timing 75), the timing detection means generates an output pulse P2 having a peak value Ih wherein Ih>Im>Il, Il=0 level.

Figure 8:
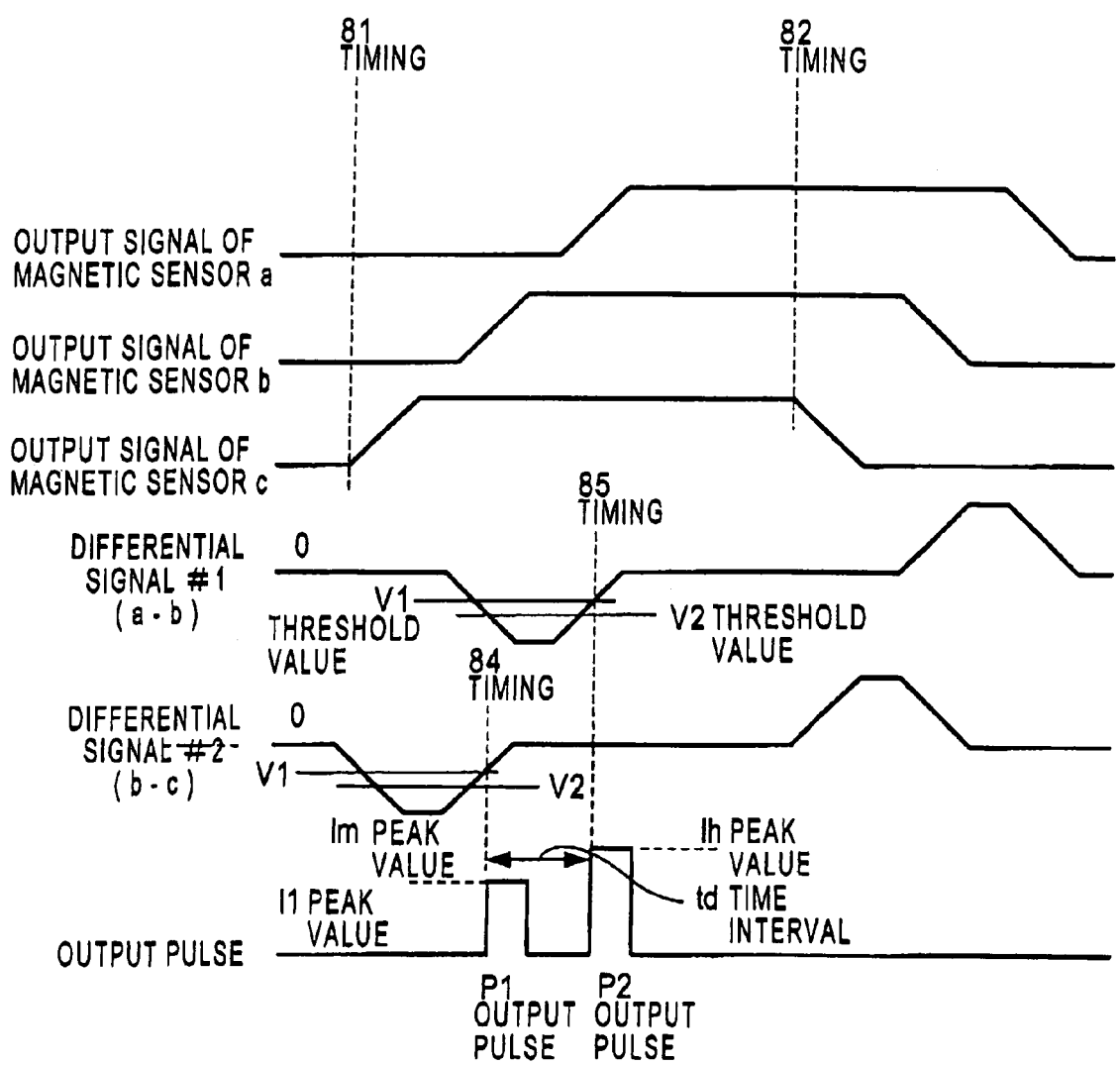
FIG. 8 is another diagram showing signal wave forms in respective sections in the invention.

Next, FIG. 8 shows a wave form obtained in the case where a rotor is rotated reversely wherein an abscissa indicates a time, and an ordinate indicates a voltage. In case of a reverse rotation, a certain rotor tooth passes through magnetic sensors c, b, and a in this order. In this case, when a leading edge in its rotating direction of a certain rotor tooth approaches the front of the magnetic sensor c (a timing 81), a voltage of an output signal in the magnetic sensor c begins to increase, and the output signal in the magnetic sensor a maintains the peak during a period wherein the rotor tooth is faced to the front of the magnetic sensor c. When a trailing edge in its rotating direction of the rotor tooth goes out of the front of the magnetic sensor c (a timing 82), the output signal in the magnetic sensor c decreases. In also the magnetic sensors b and a, similar wave forms are obtained with delayed periods of time corresponding to distances with which the magnetic sensors b and a are disposed, respectively. When compared with that in case of the normal rotation of FIG. 7, the order of the magnetic sensors a, b, and c are reversed.

The differential signal #1 produced by a differential means 24 and the differential signal #2 produced by another differential means 24 are reversed in case of the normal rotation of FIG. 7. Namely, the differential signal #2 changes first, and further, the changes starts from a descendant situation. Accordingly, first the differential signal #2 strides over the subsidiary threshold value V2 to be reduced less than the subsidiary value V2, and then it increases to stride over the normal threshold value V1 (a timing 84). At this time, a timing detection means generates an output pulse P1 having a peak value Im. Thereafter, when the differential signal #1 strides downwardly over the normal threshold value V1 (a timing 85), the timing detection means generates an output pulse P2 having a peak value Ih.

When summarized the above-mentioned operations of normal and reverse rotations, the output pulse P2 is output when the trailing edge in its rotating direction of a certain rotor tooth passes through in between the magnetic sensors a and b, while the output pulse P1 is output when the trailing edge of the rotor tooth passes through in between the magnetic sensors b and c in case of the normal rotation. On the other hand, in case of the reverse rotation, the output pulse P1 is output when the leading edge in its rotating direction of a certain rotor tooth passes through in between the magnetic sensors c and b, while the output pulse P2 is output when the leading edge of the rotor tooth passes through in between the magnetic sensors b and a. In this case, it means that a position of the trailing edge in its rotating direction of a rotor tooth in the normal rotation is the same as that of the leading edge in its rotating direction of the rotor tooth in the reverse rotation.

Since a time interval td between the output pulse P1 and the output pulse P2 represents a period of time wherein the identical rotor tooth shifts from a position between the magnetic sensors a and b to a position between the magnetic sensors c and b, it is possible to calculate a passage time of the rotor tooth from the time interval td and an alignment pitch of the magnet sensors a, b, and c.

Furthermore, when FIG. 5 is referred to, a passage time of a rotor tooth can be calculated from a time interval T(i) between an output pulse P1 (or P2) based on a passage of an i-th rotor tooth and an output pulse P1 (or P2) based on a passage of an i+1st rotor tooth. In this case, however, it is necessary that an alignment pitch of rotor teeth has been already known.

(6) Procedure for Determining Peak Value of Output Pulse

Figure 9:
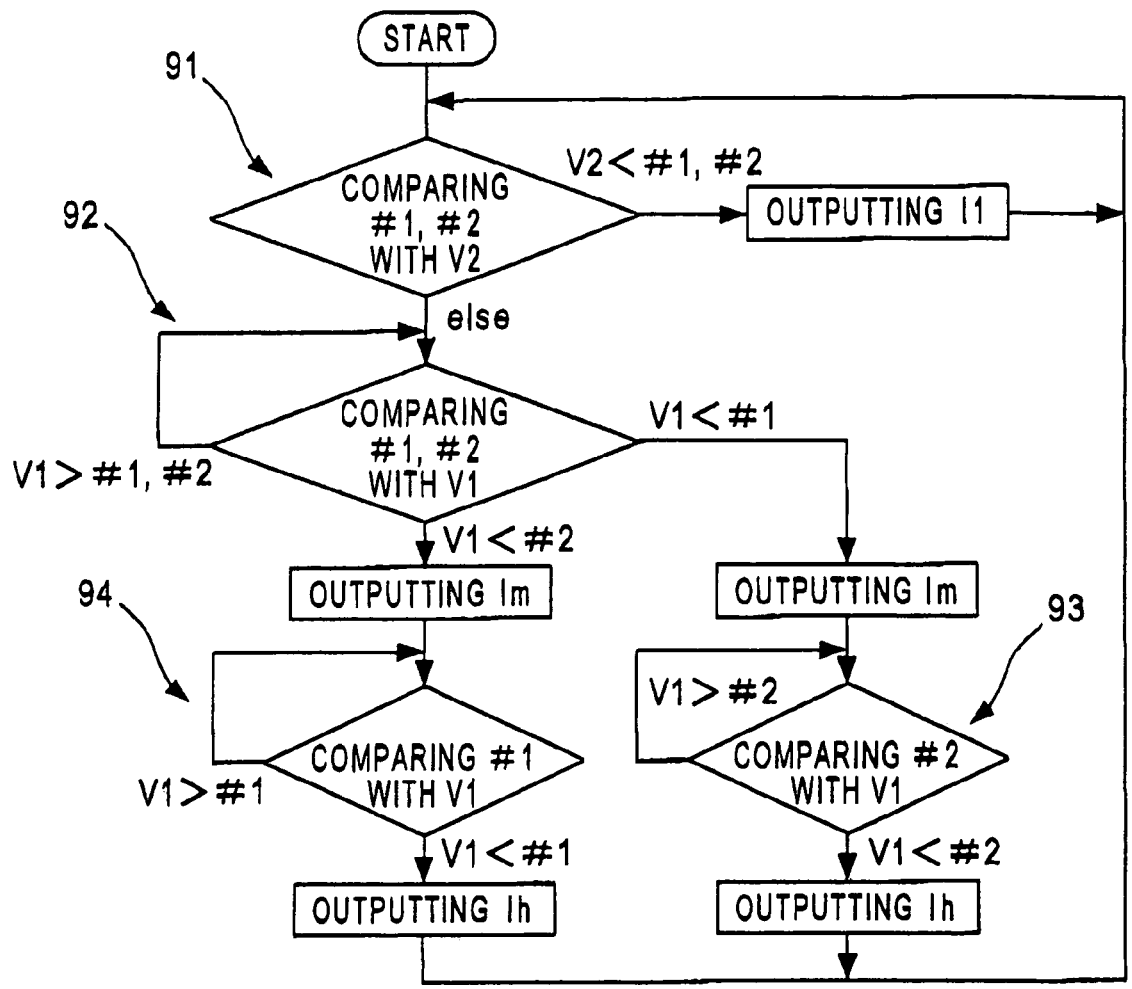
FIG. 9 is a flowchart for determining a peak value of an output pulse.

In case of a normal rotation, an output pulse P1 is produced from a differential signal #1, while in case of a reverse rotation, the output pulse P1 is produced from a differential signal #2. A procedure therefor will be shown in FIG. 9.

When a differential signal (a–b) is represented by a signal #1 and a differential signal (b–c) is represented by a signal #2, a timing detection means compares these signals #1 and #2 with a subsidiary threshold value V2 in a step 91. As a result, when both the signals #1 and #2 are less than the subsidiary threshold value V2, its procedure shifts to a step 92.

In the step 92, the signals #1 and #2 are compared with the normal threshold value V1. When the signal #1 is more than the normal threshold value V1, a peak value Im is output, while when the signal #2 is more than the normal threshold value V1, the peak value Im is output. As described above, when either of the signal #1 or the signal #2 exceeds the normal threshold value V1, the peak value Im is output. In this case, however, when the peak value Im is output based on the signal #1, the procedure shifts to a step 93, while when the peak value Im is output based on the signal #2, the procedure shifts to a step 94. An output of the peak value Im is automatically maintained by a predetermined period of time, and then, canceled to return to a peak value Il.

In the step 93, the signal #2 is compared with the normal threshold value V1, and when the signal #2 exceeds the normal value V1, a peak value Ih is output.

On the other hand, the signal #1 is compared with the normal threshold value V1 in the step 94, and in this case, when the signal #1 is less than the normal threshold value V1, the peak value Il is maintained. However, when the signal #1 exceeds the normal threshold value V1, the peak value Ih is output. In this case, an output of the peak value Ih has the same behavior as that in the case of Im, so that the output of the peak value Ih is automatically maintained by a predetermined period of time, and then, canceled to return to the peak value Il.

When summarized the above-described procedures, there is such a stream that either of the signals #1 or #2 strides downwardly over the subsidiary threshold value V2, and then, when either of the signals #1 or #2 strides over the normal threshold value V1, an output pulse P1 is produced, thereafter, when the remaining signal #1 or #2 strides over the normal threshold value V1, an output pulse P2 is output.

In the case when a rotating direction changes from the normal rotation to the reverse rotation, there may occur a process for outputting an output pulse P1 in the reverse rotating direction prior to a process for outputting an output pulse P2. In this case, a generation condition for the output pulse P2 becomes not satisfied, so that the process is started again from the beginning.

Figure 10:
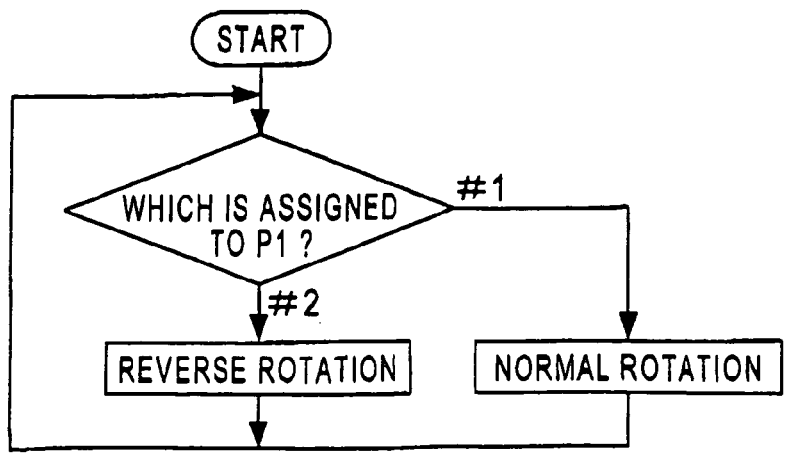
FIG. 10 is a flowchart for detecting a rotating direction in the invention.

In this procedure, when either a phenomenon wherein a process takes a route of the step 93 or a phenomenon wherein a process takes a route of the step 94 is stored as information, it becomes possible to find out a direction of passage of changes in a magnetic field, i.e. a rotating direction of a rotor. More specifically, when the output pulse P1 is produced on the basis of the signal #1, its phenomenon corresponds to that of FIG. 7, so that its direction is in the normal rotation, while when the output pulse P1 is produced on the basis of the signal #2, its phenomenon corresponds to that of FIG. 8, so that its direction is in the reverse direction. Therefore, as shown in FIG. 10, when a target to which the output pulse P1 is assigned is the signal #1, it may be judged that the direction is in the normal rotation, while when a target to which the output pulse is assigned is the signal #2, it may be judged that the direction is in the reverse rotation. The results of the judgment may be utilized later as statuses.

(7) Timing of Producing Output Pulse (According to a First Embodiment)

Figure 11:
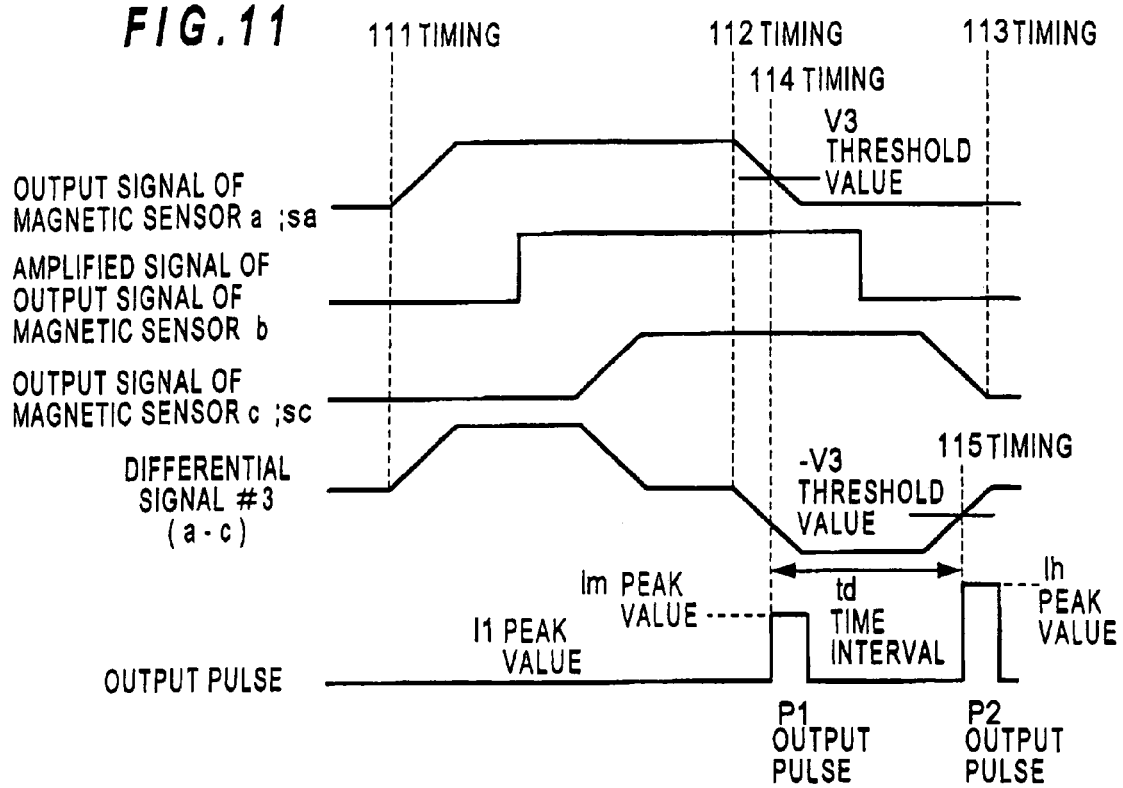
FIG. 11 is a diagram showing signal wave forms in respective sections in the invention.

FIG. 11 shows wave forms which are obtained in the case where the magnetic motion sensor of FIG. 1A is used in the circuit of FIG. 2B, and when a rotor is rotated in the normal direction. As shown in FIG. 11, when a leading edge in its rotating direction of a certain rotor tooth approaches the front of a magnetic sensor a (a timing 111), a voltage of an output signal in the magnetic sensor a begins to increase, and the output signal in the magnetic sensor a maintains the peak during a period wherein the rotor tooth is faced to the front of the magnetic sensor a. When a trailing edge in its rotating direction of the rotor tooth goes out of the front of the magnetic sensor a (a timing 112), the output signal in the magnetic sensor a decreases. Since a magnetic sensor b has different roles, it is not used for a differential means, but it produces a rectangular signal which notifies a timing wherein the leading edge in its rotating direction of a rotor tooth approaches the front of the magnetic sensor b by amplifying simply an output signal. In also the magnetic sensor c, a similar wave form is obtained with a delayed period of time corresponding to a distance with which the magnetic sensor a is disposed.

A differential signal (a–c) produced by a differential means 24 (hereinafter referred to as "signal #3") ascends and descends between an ascendant period in an output signal of the magnetic sensor a and an ascendant period in an output signal of the magnetic sensor c, and the differential signal becomes 0 during a period wherein both output signals of the magnetic sensors a and c maintain their peaks to be canceled with each other. During a period from starting a descendant in an output signal of the magnetic sensor a (a timing 112) to finishing a descendant in an output signal of the magnetic sensor c (a timing 113), the differential signal #3, descends once, and then ascends.

For the sake of convenience in an explanation, it is assumed that a timing detection means has only one threshold value to be applied to a signal being a target for timing detection.

When the signal to be a target strides over the threshold value, an output pulse is produced. When an output signal of the magnetic sensor a rises more than 0 and exceeds a threshold value V3 to become higher than the threshold value V3, a production of an output pulse comes to be possible. Thus, when an output signal of the magnetic sensor a descends and strides over the threshold value V3 (a timing 114), the timing detection means generates an output pulse P1 having a peak value Im.

When the differential signal #3 descends less than 0 and strides over a threshold value −V3 to become less than the threshold value −V3, a production of an output pulse comes to be possible. When the differential signal #3 ascends to stride over the threshold value −V3 (a timing 115), the timing detection means generates an output pulse P2 having a peak value Ih. It is to be noted that there is the same relationship Ih>Im>Il as that mentioned above.

Figure 12:
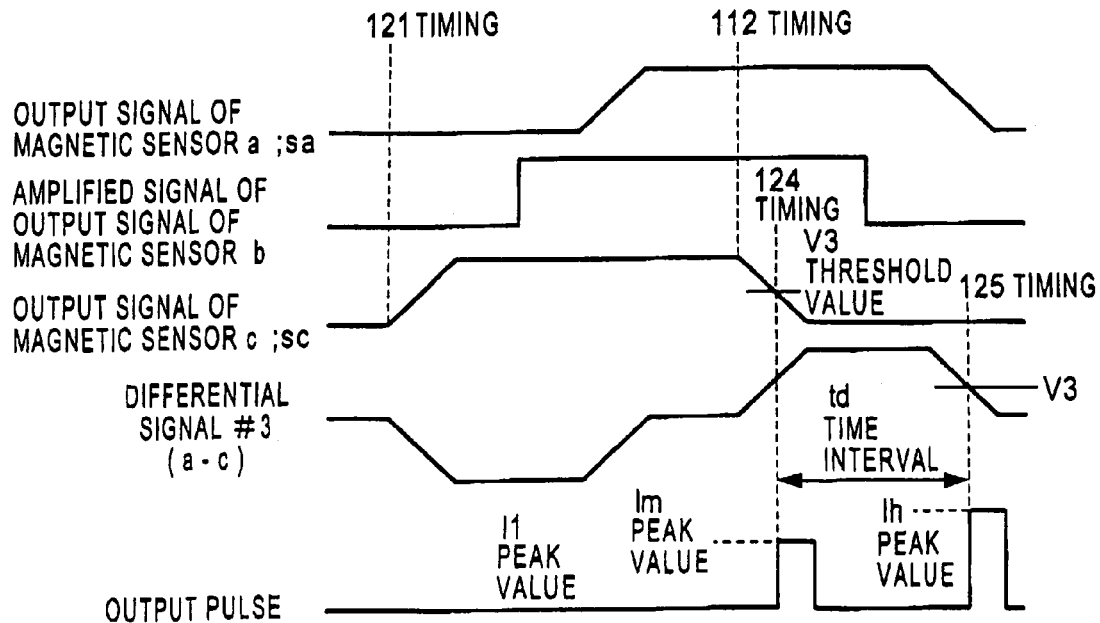
FIG. 12 is a diagram showing signal wave forms in respective sections in the invention.

Next, FIG. 12 shows a wave form obtained in the case where a rotor is rotated in the reverse direction wherein an abscissa indicates a time, and an ordinate indicates a voltage. In case of the reverse direction, a certain rotor tooth passes through magnetic sensors c, b, and a in this order. In this case, when a leading edge in its rotating direction of a certain rotor tooth approaches the front of the magnetic sensor c (a timing 121), a voltage of an output signal in the magnetic sensor c begins to increase, and the output signal in the magnetic sensor c maintains the peak during a period wherein the rotor tooth is faced to the front of the magnetic sensor c. When a trailing edge in its rotating direction of the rotor tooth goes out of the front of the magnetic sensor c (a timing 122), the output signal in the magnetic sensor c decreases. In also the magnetic sensors b and a, similar wave forms are obtained with delayed periods of time corresponding to distances with which the magnetic sensors b and a are disposed, respectively. When compared with the case of the normal rotation of FIG. 11, the order of the magnetic sensors a, b, and c is reversed. With respect to the magnetic sensor b, an amplification signal for an output signal is illustrated.

A differential signal #3 produced by a differential means 24 starts from a descendant situation on the contrary to the case of the normal rotation of FIG. 11. First, when an output signal of a magnetic sensor c ascends and exceeds a threshold value V3 to become more than the threshold value V3, a production of an output pulse comes to be possible. On one hand, when an output signal of the magnetic sensor c descends and strides over the threshold value V3 (a timing 124), a timing detection means generates an output pulse P1 having a peak value Im. Then the differential signal #3 decreases, and strides over the threshold value V3 (a timing 125). In this case, the timing detection means generates an output pulse P2 having a peak value Ih.

When summarized operations of the normal and reverse rotations as described above, the output pulse P1 is output when the trailing edge in its rotating direction of a certain rotor tooth passes through the magnetic sensor a, while the output pulse P2 is output when the rotor tooth passes through in between the magnetic sensors a and c in case of the normal rotation. In case of the reverse rotation, when the leading edge in its rotating direction of a certain rotor tooth passes through the magnetic sensor c, the output pulse P1 is output, while when the rotor tooth passes through in between the magnetic sensors c and a, the output pulse P2 is output.

Although the timing detection means outputs the output pulses P1 and P2 at different positions, i.e. the trailing edge and the leading edge of a rotor tooth in the respective rotating directions in the normal and reverse rotations, it is not essential to watch an identical edge in both normal and reverse rotations from a viewpoint of observing a moving speed in an edge of a rotor tooth, and thus, a generality is not denied in a manner of such treatment.

Since a time interval td between the output pulse P1 and the output pulse P2 represents a period of time wherein the identical rotor tooth shifts between the magnetic sensors a and c, it is possible to calculate a passage time of the rotor tooth from the time interval td and an alignment pitch of the magnet sensors a, and c.

(8) Procedure for Determining Peak Value of Output Pulse

Figure 13:
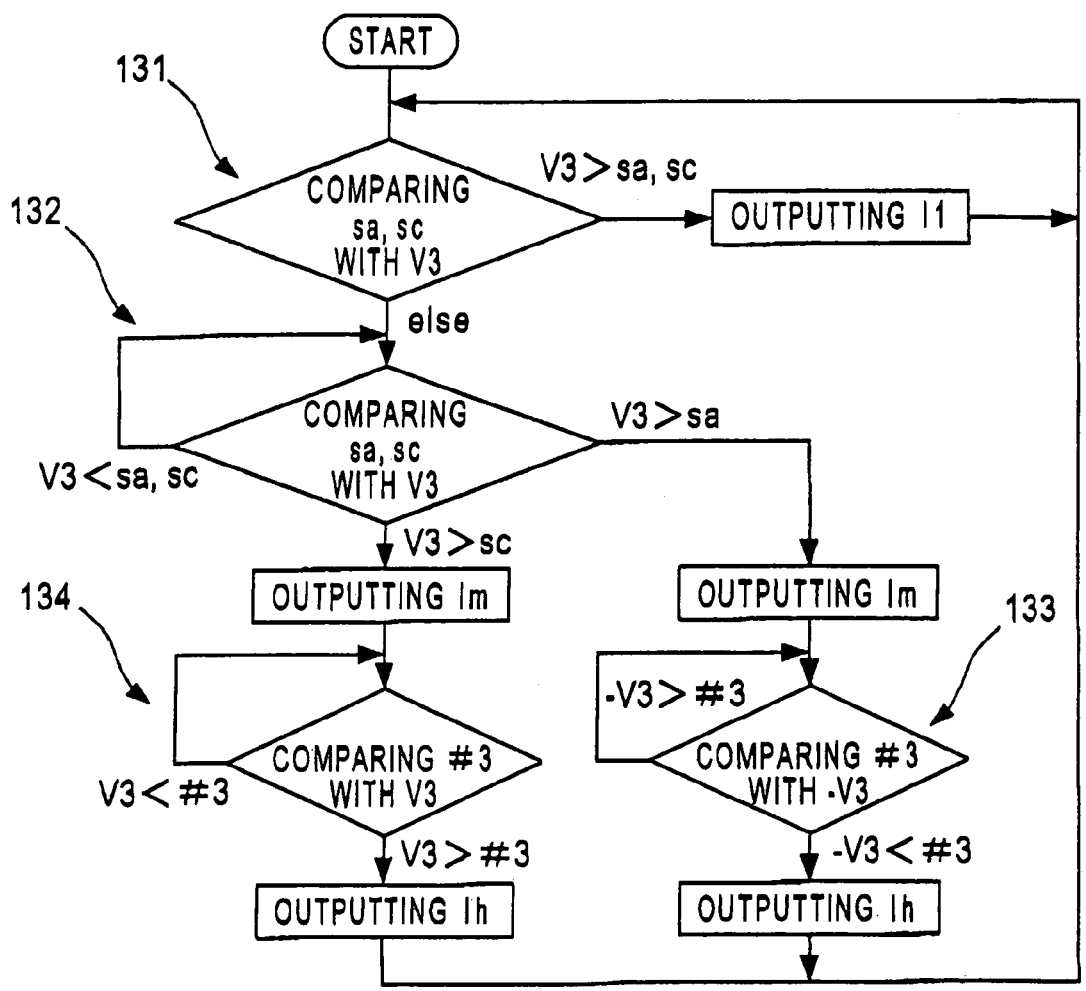
FIG. 13 is a flowchart for determining a peak value of an output pulse.

In case of the normal rotation as shown in FIG. 11, an output pulse P1 is produced from an output signal sa, while an output pulse P1 is produced from an output signal sc in case of the reverse rotation as shown in FIG. 12. A procedure therefor is shown in FIG. 13.

When a differential signal (a–c) is represented by a signal #3, a timing detection means compares output signals sa and sc with a threshold value V3 in a step 131. In this case, when both the output signals sa and sc are less than the threshold value V3, a peak value Il is output. If not, however, the procedure shifts to a step 132.

In the step 132, the output signals sa and Sc are compared with the threshold value V3. As a result, when the output signal sa is less than the threshold value V3, a peak value Im is output, or when the output signal sc is less than the threshold value V3, a peak value Im is output. As described above, either of the output signals sa and sc strides over the threshold value V3, a peak value Im is output. In this case, however, when a peak value Im is output based on the output signal sa, the procedure shifts to a step 133, while when a peak value Im is output based on the output signal sc, the step shifts to a step 134.

As in the case as that mentioned above, an output of the peak value Im is automatically maintained in a predetermined time length, and then, canceled to return to a peak value Il.

In the step 133, the signal #3 is compared with a threshold value –V3. When the signal #3 strides over the threshold value –V3, a peak value Ih is output.

On the other hand, the signal #3 is compared with the threshold value V3 in the step 134, and when the signal #3 strides over the threshold value V3, a peak value Ih is output.

In this case, an output of the peak value Ih is automatically maintained in a predetermined time length as in the case of the peak value Im, and then, canceled to return to a peak value Il.

When summarized the above-described procedures, there is such a stream that when either of the output signals sa and sc strides downwardly over the threshold value V3, an output pulse P1 is produced, and then, when the signal #3 strides upwardly over a threshold value –V3 in case of a normal rotation, or when the signal #3 strides downwardly over the threshold value V3 in case of a reverse rotation, an output pulse P2 is output.

Figure 14:
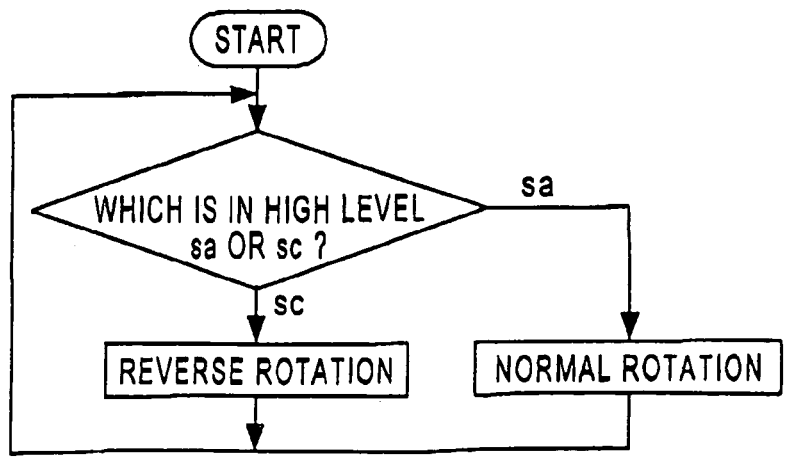
FIG. 14 is a flowchart for detecting a rotating direction in the invention.

During this procedure, when it is verified that which output signal sa or sc is in a high level at the time when an output signal (an amplification signal; see FIGS. 11 and 12) of a magnetic sensor b changes from a low level to a high level, it is possible to determine that rotor teeth is rotated in a normal direction or a reverse direction. As shown in FIG. 14, when the output signal sa is in a high level, its situation corresponds to that of FIG. 11, whereby it is determined that the rotor teeth is rotated in the normal direction, while when the output signal sc is in a high level, it is determined that the rotor teeth is rotated in the reverse direction. The results of the determination may be utilized for statuses later.

Advantages provided by the operations described herein before will be summarized once.

First, an advantage achieved by the use of differential signals is in that influences derived from electromagnetic noises and mechanical noises are moderated. If noises appear on + sides of output signals of respective magnetic sensors due to discharge in the outside, the noises are canceled with each other, when finite differences are taken into. Accordingly, troubles disappear in the case when the respective differential signals are compared with a threshold value.

Furthermore, when a gap between a rotor tooth and each of magnetic sensors changes due to a mechanical vibration, noises corresponding to an amount of changes in the gap are superposed to each magnetic sensor, it may be canceled by taking into a finite differential.

An advantage attained by using a normal threshold value V1 and a subsidiary threshold value 2 is in that it can prevent to output an output pulse at an undesired timing, whereby such a phenomenon that a differential signal strides upwardly over the normal threshold value V1 can be positively captured in the case where a rotation of a rotor is slow and an inclination of an output signal in a magnetic sensor is gradual, or the case noises are superposed in addition to the former case.

An advantage for producing two output pulses P1 and P2 with respect to a passage of a single rotor tooth is in that a passage speed of a rotor tooth can be calculated from a time interval td and an alignment pitch of magnetic sensors a, b, and c. This means that a part (Hall IC) independent completely from a rotor can be individually provided in the magnetic motion sensors of FIGS. 1A and 1B.

Moreover, an advantage for producing two output pulses P1 and P2 per a passage of one rotor tooth is in that since output wave forms of the magnetic sensors a, b, and c obtained from the same single rotor tooth are identical with each other, a time interval td of the output pulses P1 and P2 is not adversely affected by a dispersion or a deficiency of rotor teeth in even a case where there is a dispersion or a deficient in a dimension of individual rotor teeth. For this reason, each passage speed in individual rotor teeth can be precisely detected.

Furthermore, an advantage for producing two output pulses P1 and P2 per a passage of one rotor tooth is in that a passage speed of a rotor tooth can be detected independent of a rotating speed of a rotor, i.e. it is not adversely affected by a slow rotating speed of the rotor in a case where a period of time determined by a passage of a certain rotor tooth and that of the following rotor tooth is even lengthy.

An advantage achieved by making a peak value of a pulse P1 which is obtained first in output pulses produced from two objective signals (two differential signals #1 and #2, or output signals of magnetic sensors a, and b) different from that of the following pulse P2 is in that even when a communication means 28 outputs these output pulses P1 and P2 through the same signal line, a superior device by which these output pulses. P1 and P2 are received can discriminates easily a type of the output pulses.

In the following, a communication mode and a control of output pulse width will be described item by item.

(9) Communication Mode

As already described, a status signal S is output in between an output pulse P2 based on a passage of a certain rotor tooth and an output pulse P1 based on a passage of the following rotor tooth. However, a time interval between the output pulse P2 and the output pulse P1 becomes short with increase in a rotating speed of the rotor. This means that a time for processing a production of status signals in its magnetic motion sensor is restricted. In addition, a processing time wherein status signals are used is restricted in also a superior device by which the status signals are received.

Figure 15A:
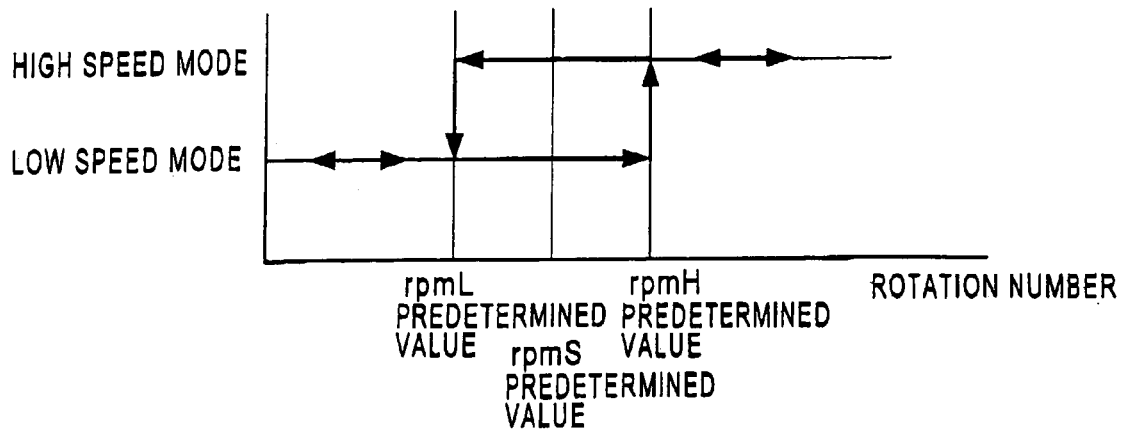
FIG. 15A is a diagram showing a communication mode transition in the invention.
Figure 15B:
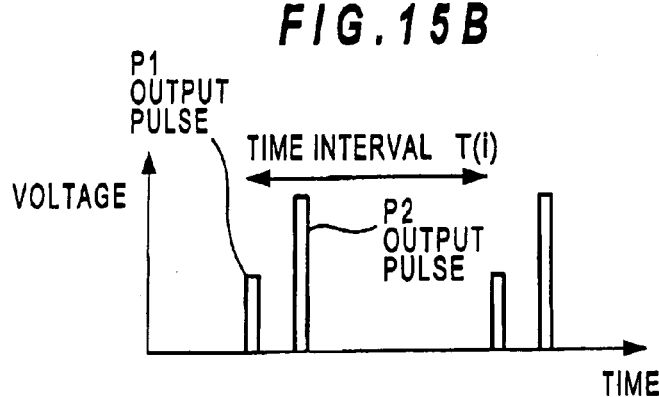
FIG. 15B is a waveform diagram showing output signals to the outside in case of a high-speed mode.

In this connection, a communication mode is selected in a calculation means 27. FIG. 15A is a waveform diagram wherein a rotation number is plotted as abscissa and a type of communication mode as ordinate. Since a rotation number is proportional to a passage speed of rotor teeth, it may be interpreted that the passage speed of the rotor teeth is plotted as the abscissa. FIG. 15B indicates an output signal pattern in a high speed mode, and FIG. 15C indicates an output signal pattern in a low speed mode, respectively.

Figure 15C:
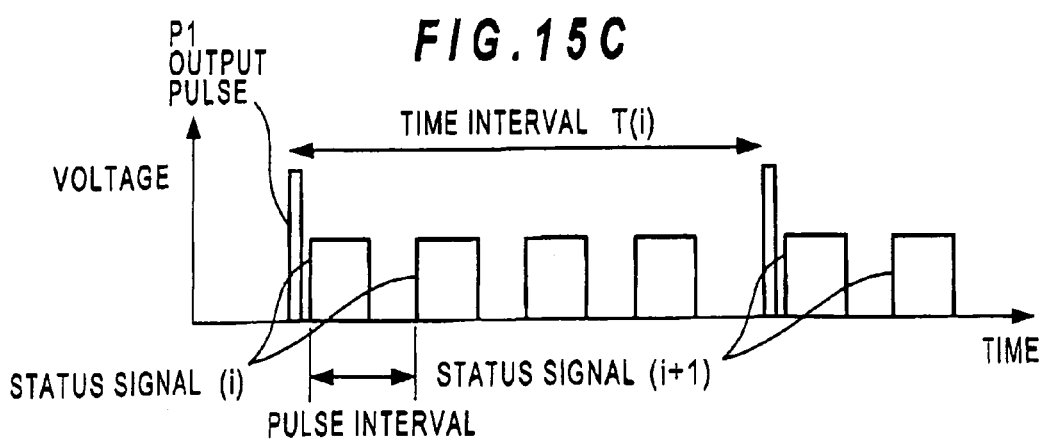
FIG. 15C is a waveform diagram showing output signals to the outside in case of a low-speed mode.

In a high speed mode of FIG. 15B, only the output pulses P1 and P2 are output, and no status signal S is output, while in a low speed mode of FIG. 15C, both of the output pulse P2 only and the status signal S are output. Although a time length of the output pulse P2 is a fixed value as mentioned below, a time interval between a start of transmission of the status signal S and a trailing edge of the output pulse P2 is also made to be, for example, the above-described fixed value.

A constitution of the status signal S is, for example, eleven bits of FIG. 6 as mentioned above, but a pulse width of respective bits and a distance between adjacent pulses may be the above-described fixed values with taking an easiness in an a synchronism in case of communication into consideration. Moreover, the respective bits may be subjected to, for example, split-phase modulation or the like.

In case of a low speed mode as shown in FIG. 15A, when a rotation number exceeds a predetermined value rmsS to be increased and reaches a predetermined value rmsH more than the predetermined rmsS, a high speed mode is selected.

On the other hand, when a rotation number strides over the predetermined rmsS to be decreased and reaches a predetermined value rmsL less than the predetermined value rmsS, a low speed mode is selected. In an extent defined between the predetermined value rmsL and the predetermined value rmsH, a communication mode theretofore is maintained. In other words, a hysteresis is given for a changeover of a communication mode. Because of the hysteresis, frequent changeovers of communication modes can be prevented even when a rotation number transits upwards and downwards slightly beyond the predetermined value rmsS.

(10) Output Pulse Width

In case of a high rotating speed of a rotor, since a period of time from an output pulse P2 to an output pulse P1 is short, a duration of the output pulse P1 or P2 is desirably short. In this respect, however, there is a case where a pulse width of a pulse to be received by a superior device is restricted. For instance, since car-mounted devices are in an atmosphere where heavy electromagnetic noises exist, an input signal is effectively read in only the case where the input signal accompanies with a period of time wherein a level of the input signal is settled for a certain length of time. For this reason, it is not desired that a width of the output pulse P1 or P2 becomes narrow indefinitely. A measuring instrument side for receiving a sensor output is provided with a filter circuit for removing reception signals in a region of a high frequency for avoiding influences of ambient noises such as electromagnetic noises. In this respect, for example, electromagnetic wave noise is generally around 50 kHz. Accordingly, when a pulse width of an output pulse P1 or P2 is set up such that a cutoff frequency in a low-pass side is 25 kHz or less by making the peak frequency to be around 50 kHz, it becomes possible to receive signals without removing them by a filter of the measuring instrument.

In the following, procedures for producing a status signal S and implications thereof will be described in individual statuses.

As pointed out in a rotation sensor of the prior art, there are dispersions in dimensions of a gap between a rotor tooth and a magnetic sensor, or in characteristics of magnets. Due to such dispersions, output signals of a magnetic sensor become different from one another. As a result, influences appear as to a timing detection which is described hereinbefore. In this respect, however, there has been heretofore no means whether or not a dimension of a gap is pertinent, or characteristics of a magnet are pertinent.

Thus, the present invention provides such a manner that waveform characteristics involved in output signals of a magnetic sensor are analyzed to estimate dimensions of a gap and characteristics of a magnet, and it makes possible to notify the results of the estimation as statuses to the outside. More specifically, peaks of output signals of a magnetic sensor are detected, moving average deviations of peak values are calculated with respect to peaks of plural times obtained by repeated detections, and a status indicating a reliability of detection in changes of a magnetic field is produced based on the moving average deviations and individual peak values.

(11) Reliability of Detection in Changes of Magnetic Field

Figure 16:
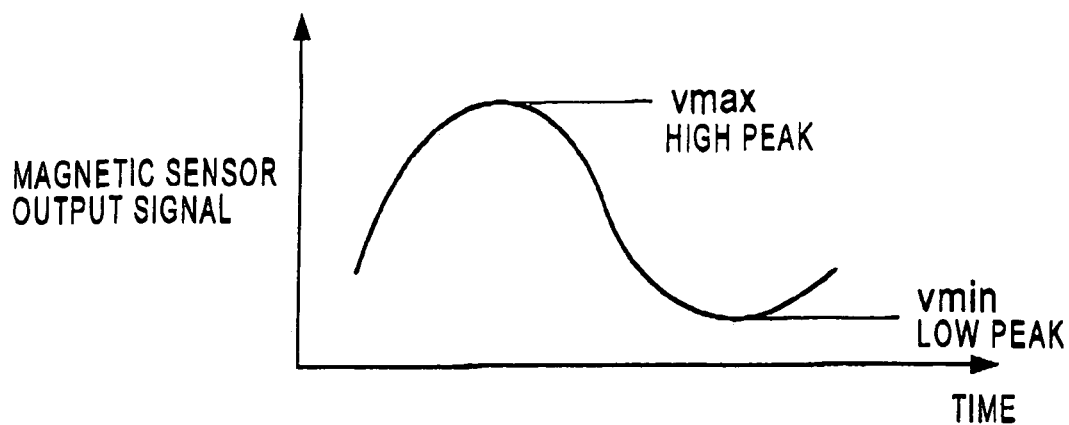
FIG. 16 is a waveform diagram showing output signals of a magnetic sensor.

A status production means in a calculation means 27 uses an output signal in one differential means (for example, a differential means 24) in differential means for correcting influences of temperature. FIG. 16 shows a typical wave form of output signals of the differential means 24. In reality, an output signal of a differential means 241 is, for example, analog-to-digital converted in eight gradation sequences by an A/D converter 25. However, for making a principle therefor clear, a curvilinear wave form is used in FIG. 16.

Figure 17:
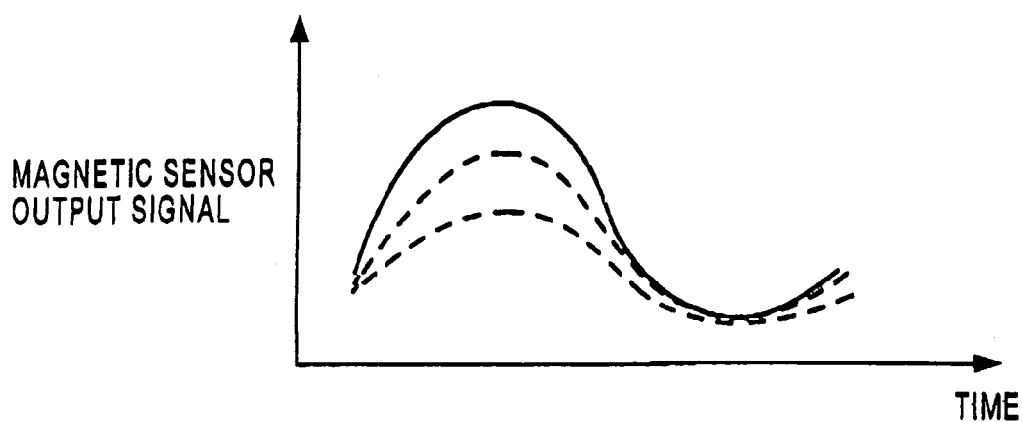
FIG. 17 is a waveform diagram showing output signals of a magnetic sensor.

In this respect, when a magnetic field is allowed to weaken by weakening a magnetic force of a magnet, a size of a wave becomes totally small in proportion to the weakening operation in an output signal of the differential means 24 as shown by broken lines in FIG. 17 (the solid line indicates the same curve as that of FIG. 16).

Figure 18:
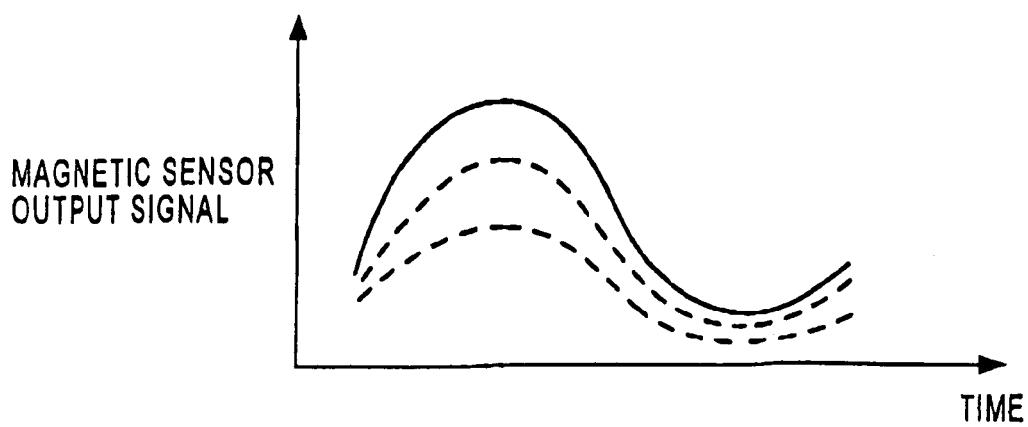
FIG. 18 is a waveform diagram showing output signals of a magnetic sensor.

When a magnetic field is made to be constant and magnetic sensors a and b are allowed to be going to set apart from a rotor, a wave height in an output signal of the differential means 24 decreases as shown by broken lines in FIG. 18 in the case where a rotor tooth approaches (the solid line indicates the same curve as that of FIG. 16).

For the sake of taking out numerically these waveform characteristics, a status production means performs the following procedures.

First, a high peak vmax (i) and a low peak vmin (i) of output signals in the differential means 24 are detected, respectively. When a rotor is rotated, output signals containing a peak and a trough as shown in FIG. 16 are obtained repeatedly. As a result, the high peak vmax (i) and the low peak vmin (i) are also repeatedly obtained wherein i designates the number of times thereof.

Next, moving average deviations are calculated with respect to the respective peaks. In other words, a moving average deviation Vmax (i) of this time is calculated from the latest high peak vmax (i) and the previous moving average deviation Vmax (i−N) in accordance with the following formula (1). The latest Vmin (i) is calculated from the following formula (2) by the same manner as that described above.

$$V\max(i) = \{(N-1)\, V\max(i-1) + v\max(i)\}/N \quad (1)$$

$$V\min(i) = \{(N-1)\, V\min(i-1) + v\min(i)\}/N \quad (2)$$

wherein N corresponds to a time constant when the formulae (1) and (2) are considered to be a first-order lag filter, and it may be a constant value.

A difference Vg between a moving average deviation Vmax (i) of a high peak and a moving average deviation Vmin (i) of a low peak is sufficiently large, a timing detection can be positively made. On the contrary, when a difference Vg is small, a timing detection becomes difficult. In this respect, a status production means classifies a magnitude of the difference Vg into eight gradation sequences to produce a status represented by a numerical value of three bits. The 3-bit status means a degree of appropriateness in a position of installation for magnetic sensors a and b with respect to a rotor. In other words, it means that the larger numerical value represented by three bits can attain the more sensitive detection of changes in a magnetic field due to a rotor tooth by means of the magnetic sensors a and b. A small numerical value means that a sufficient difference between a high peak and a low peak cannot be obtained as a result of such fact that the magnetic sensors a and b are apart from a rotor tooth. As described above, "gap 0", "gap 1", and "gap 2" shown in FIG. 6 are produced.

The status production means produces such a status that a magnetic field is weak, when a difference between a moving average deviation Vmax (i) of a high peak and a moving average deviation Vmin (i) is less than a predetermined value. This means that a magnetic field to be sensed by the magnetic sensors a and b is weak, such phenomenon appears due to a damaged magnet or a depleted magnet, and it appears also due to an unsuitable position for installing the magnetic sensors a and b.

The status is represented by storing "1" in the "magnetic line intensity" of FIG. 6.

On the contrary, a difference between the above-described moving average deviations is higher than the predetermined value, the magnetic field is sufficiently intensive, so that "0" is stored in the "magnetic line intensity" as such a status that the magnetic field is sufficiently intensive.

Moreover, the status production means produces a status having such gist that a magnetic field is sufficiently intensive, and when a degree of appropriateness for a position of installation of the magnetic sensors a and b which is represented by the above-described 3-bit numerical value is higher than an evaluation value which is determined for a degree of appropriateness, a timing detection can be positively attained (there is a high reliability in detection for changes in a magnetic field). This status is indicated by storing "1" in the "magnetic line alarm".

Even if there is a condition wherein "1" is to be stored in the "magnetic line alarm", such a case where a difference of an absolute value in moving average deviations |Vmax (i)|−|Vmin (i)| is more than a predetermined value means that a magnetic sensitivity of the magnetic sensors a and b became abnormal, in other words, it means that an abnormal situation arises in semiconductor physical properties of the magnetic sensor a or b, and in such a case, "0" may be stored in the "magnetic line alarm".

When viewed from a side by which a status signal output is received from a communication means 28, it may be recognized that there is a high reliability in a detection for changes in a magnetic field, when "1" is stored in the "magnetic line alarm". On the other hand, when "0" is stored in the "magnetic line alarm", there is a certain problem due to which a reliability in a detection for changes in a magnetic field decreases. In this case, it is found that there is no problem as to a magnet, when "0" is stored in the "magnetic line intensity". On one hand, when "1" is stored in the "magnetic line intensity", it is found that there might be a problem as to a magnet.

Besides, positions of installation for the magnetic sensors a and b are read from numerical values of "gap 0", "gap 1", and "gap 2".

The above-described status production may be applied simultaneously to a differential means 242.

(12) Rotating Direction

As described already, a timing detection means can detect a direction of a passage of changes in a magnetic field, i.e. a rotating direction in accordance with the procedures shown in FIG. 10 or FIG. 14. A status production means produces a status based on results of the above-described detection. As a result, the "direction signal effective" and the "rotating direction" of FIG. 6 are produced. In the "rotating direction", "0" means a normal rotation (changes in a magnetic field pass through in a direction from the magnetic sensor a to the magnetic sensor c), while "1" means a reverse rotation. However, in the case where a detection of a rotating direction is not completed, or the case where changes in a magnetic field are stopped, or substantially stopped, the "direction signal effective" is made to be "0" in order to nullify a status of the "rotating direction". Thus, other part which receives a status signal can operate such that the "rotating direction" is taken in only when the "direction signal effective" is "1".

(13) Temperature

As already mentioned above, the status production means detects, for example, a low peak vamin (i) of an output signal which is not through a differential means of a magnetic sensor a, and a moving average deviation Vamin (i) of the low peak is calculated from the following formula (3).

$$V\text{amin}(i) = \{(N-1)\, V\text{amin}(i-1) + v\text{amin}(i)\}/N \quad (3)$$

Such a low peak is obtained in the case when a rotor tooth is the most apart from a magnetic sensor a. A fact that this value is in a high level means that its ambient temperature is high. In this respect, rise and fall in an ambient temperature are compared with, for example, three threshold values having different values in response to a moving average deviation Vamin (i) of a low peak, whereby a status represented by numerical values of four gradations is produced. As a result, "temperature 0" and "temperature 1" are produced.

When a magnetic sensor b is a subsidiary magnetic sensor 2b, namely, in case of the first embodiment shown in FIG. 1A, an output signal of the subsidiary magnetic sensor 2b may be used for a production of a temperature status.

Although the "temperature 0" and the "temperature 1" are not the numerical values represent directly temperatures, but they express a degree of ambient temperature in four gradations. Other part by which the status is received may know an ambient temperature of a magnetic sensor, i.e. a temperature of a rotor chamber or a hub main body, although it is in a grading manner.

Since the hub main body is usually placed at a position very near to a brake disk or a brake caliper, a temperature of the hub main body is raised by a radiation heat or a conduction heat radiated therefrom.

A high frictional heat generates in case of braking due to an erroneous operation by a driver or in case of troubles in a brake disk, a pad, and a caliper, it makes the brake disk or the caliper temperature to be an abnormally high temperature. In this case, however, a temperature situation among parts of the brake can be known without requiring measuring directly a temperature of the brake disk or the caliper according to the status although it is through a temperature rise of the hub main body.

As described above, since a magnetic motion sensor according to the invention outputs status signals, superior devices may know conditions whether or not positions for installing magnetic sensors are appropriate, and whether or not characteristics of a magnet are appropriate. Moreover, information of rotating directions which cannot be obtained by only output pulses is also obtained.

Although it is not contained in the above-described embodiments, other information may be incorporated in a status signal. For instance, when a moving average deviation Vmax (i) of high peaks is compared with one high peak vmax (i), a dispersion in heights of rotor teeth can be evaluated. When the evaluated results are output as statuses, it may be utilized for detecting an initial failure of a rotor in a product line of automobiles and the like.

Furthermore, when an interval between output pulses P1 and P2 is measured by a magnetic motion sensor and the results measured (pulse rates) are incorporated in status signals, the trouble of a calculation for the pulse rates can be saved in a superior device.

Moreover, when information of a rotor (the number of teeth, a diameter, a circumferential length and the like) is stored in a magnetic motion sensor, a pulse rate can be converted to a rotation number (or a rotating speed) to be output.

When information of an automobile (a diameter or a circumferential length of a tire) has been previously stored, a speed of the automobile can be output.

A manner for outputting the above-described status signals, measured results, converted results and the like may be carried out in accordance with a wireless system.

Although a magnetic motion sensor is utilized for a detection in rotation of a rotor in the above-described embodiments, the invention may be combined with magnetic teeth or magnets aligned linearly to be also served for a linear motion detection.

Since the invention is arranged in such that statuses of output pulses P1 and P2 or a moving direction are produced with respect to a passage of one rotor tooth, it may be utilized for a motion detection of a single magnetic body or a single magnet.

As mentioned above, the present invention provides the following excellent advantageous effect.

According to the invention, a reliability of a magnetic motion sensor can be elevated.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A magnetic motion sensor, comprising:
   two magnetic sensors disposed along a direction in which a change in magnetic field shifts to detect the change;
   a differential means for taking out a differential signal of output signals from the two magnetic sensors; and
   a timing detection means for generating a pulse indicating a timing that a change in magnetic field passes through either of the magnetic sensors when an output signal of said either of magnetic sensor strides over a threshold value, and for generating a pulse indicating a timing that a change in magnetic field passes through in between the magnetic sensors when the differential signal strides over the threshold value.

2. The magnetic motion sensor according to claim 1, wherein:
   the timing detection means has two threshold values having different values applied to a signal to be a target, and when the signal to be a target strides over either of the threshold value and then strides over the other threshold value, the pulse is generated.

3. The magnetic motion sensor according to claim 1, wherein:
   the timing detection means operates such that a peak value of a pulse which is obtained first in the pulses obtained from two signals to be targets is made to differ from a peak value of the pulse obtained subsequently.

4. The magnetic motion sensor according to claim 1, wherein:
   the timing detection means detects a passage direction of the changes in a magnetic field dependent upon an order which signal in the two signals to be targets is a precedential to obtain the pulse.

5. The magnetic motion sensor according to claim 1, wherein:
   the timing detection means detects whether or not there is no change in a magnetic field, or that there are very little changes in a magnetic field based on such fact that the pulse is not obtained for a certain period of time.

6. The magnetic motion sensor according to claim 1, comprising further a communication means for outputting the two pulses to the outside through the same signal line.

7. The magnetic motion sensor according to claim 6, wherein:
   the communication means outputs status signals indicating statuses of the magnetic motion sensor to the outside through the same signal line.

8. The magnetic motion sensor according to claim 7, wherein:
   the communication means calculates a passage speed of the changes in a magnetic field from a time interval between the two pulses and alignment gaps of the magnetic sensors, and inserts the status signals in between the two pulses and the following two pulses to be output to output, when the passage speed becomes slower as a result of striding over a predetermined value, while stops to output the status signals, when the passage speed becomes faster as a result of striding over the predetermined value.

9. The magnetic motion sensor according to claim 1, comprising further a status production means for detecting peaks of output signals of the magnetic sensors, calculating a moving average deviation of peak values with respect to peaks obtained repeatedly over plural times, and producing a status indicating a reliability in detection for the changes in a magnetic field based on the moving average deviation.

10. The magnetic motion sensor according to claim 9, wherein:
the status production means detects high peaks and low peaks of output signals of the magnetic sensors, calculates the moving average deviations with respect to the respective peaks to produce statuses indicating a degree of appropriateness in positions of installation for magnetic sensors by numerical values in response to a difference between a moving average deviation of high peaks and a moving average peaks of low peaks, produces such a status that there is a weak magnetic field, when the moving average deviation of the high peaks is less than a predetermined value for the high peaks, while produces such a status that there is a sufficient magnetic field, when the moving average deviation of the high peaks is more than a predetermined value for the high peaks, and produces such a status that there is a high reliability in detection for the changes in a magnetic field, when the magnetic field is sufficient and the degree of appropriateness in positions of installation for the magnetic sensors is higher than a predetermined value for the degree of appropriateness.

11. The magnetic motion sensor according to claim 10, wherein:
the status production means produces a status indicating a passage direction of the changes in a magnetic field.

12. The magnetic motion sensor according to claim 10, wherein:
the status production means detects low peaks of output signals of the magnetic sensors, and produces a status indicating rise and fall of an ambient temperature by ranks in response to the moving average deviation with respect to the peaks.

13. The magnetic motion sensor according to claim 9, wherein:
the status production means produces a status indicating a passage direction of the changes in a magnetic field.

14. The magnetic motion sensor according to claim 9, wherein:
the status production means detects low peaks of output signals of the magnetic sensors, and produces a status indicating rise and fall of an ambient temperature by ranks in response to the moving average deviation with respect to the peaks.

15. A magnetic motion sensor, comprising:
three magnetic sensors disposed along a direction in which a change in magnetic field shifts to detect the change;
a differential means for taking out a differential signal of output signals from two magnetic sensors of the three magnetic sensors; and
a timing detection means for generating a pulse indicating a timing that a change in magnetic field passes through a magnetic sensor which is not used for the differential means when an output signal of said magnetic sensor not used for the differential means strides over a threshold value, and for generating a pulse indicating a timing that a change in magnetic field passes through in between the magnetic sensors when the differential signal strides over the threshold value.

16. The magnetic motion sensor according to claim 15, wherein:
the timing detection means has two threshold values having different values applied to a signal to be a target, and when the signal to be a target strides over either of the threshold value and then strides over the other threshold value, the pulse is generated.

17. The magnetic motion sensor according to claim 15, wherein:
the timing detection means operates such that a peak value of a pulse which is obtained first in the pulses obtained from two signals to be targets is made to differ from a peak value of the pulse obtained subsequently.

18. The magnetic motion sensor according to claim 15, wherein:
the timing detection means detects a passage direction of the changes in a magnetic field dependent upon an order which signal in the two signals to be targets is a precedential to obtain the pulse.

19. The magnetic motion sensor according to claim 15, wherein:
the timing detection means detects whether or not there is no change in a magnetic field, or that there are very little changes in a magnetic field based on such fact that the pulse is not obtained for a certain period of time.

20. A magnetic motion sensor, comprising:
three magnetic sensors disposed along a direction in which a change in magnetic field shifts to detect the change;
a differential means for taking out a differential signal of output signals from two magnetic sensors in each of two pairs selected from the three magnetic sensors; and
a timing detection means for generating a pulse indicating a timing that a change in magnetic field passes through in between either of the two pairs of the magnetic sensors when the differential signal of said either of the two pairs of the magnetic sensors strides over a threshold value.

21. The magnetic motion sensor according to claim 20, wherein:
the timing detection means has two threshold values having different values applied to a signal to be a target, and when the signal to be a target strides over either of the threshold value and then strides over the other threshold value, the pulse is generated.

22. The magnetic motion sensor according to claim 20, wherein:
the timing detection means operates such that a peak value of a pulse which is obtained first in the pulses obtained from two signals to be targets is made to differ from a peak value of the pulse obtained subsequently.

23. The magnetic motion sensor according to claim 20, wherein:
the timing detection means detects a passage direction of the changes in a magnetic field dependent upon an order which signal in the two signals to be targets is a precedential to obtain the pulse.

24. The magnetic motion sensor according to claim 20, wherein:
the timing detection means detects whether or not there is no change in a magnetic field, or that there are very little changes in a magnetic field based on such fact that the pulse is not obtained for a certain period of time.

* * * * *